(12) United States Patent
Garg et al.

(10) Patent No.: US 7,882,213 B2
(45) Date of Patent: Feb. 1, 2011

(54) NETWORK MANAGEMENT SYSTEM TO MONITOR MANAGED ELEMENTS

(75) Inventors: Atul Garg, Saratoga, CA (US); Joe Scarpelli, Mountain View, CA (US); Rajesh Badhe, Sunnyvale, CA (US); Dasari Subramanyeswara Rao, Bangalore (IN)

(73) Assignee: BMC Software, Inc., Houston, TX (US)

( * ) Notice: Subject to any disclaimer, the term of this patent is extended or adjusted under 35 U.S.C. 154(b) by 1305 days.

(21) Appl. No.: 10/452,134

(22) Filed: Jun. 3, 2003

(65) Prior Publication Data

US 2004/0249931 A1 Dec. 9, 2004

(51) Int. Cl.
G06F 15/173 (2006.01)

(52) U.S. Cl. .................. 709/224; 709/233; 715/733

(58) Field of Classification Search .................. 709/224, 709/223; 715/733
See application file for complete search history.

(56) References Cited

U.S. PATENT DOCUMENTS

| | | | | |
|---|---|---|---|---|
| 5,999,179 A | * | 12/1999 | Kekic et al. | 715/734 |
| 6,161,152 A | * | 12/2000 | Garg et al. | 710/46 |
| 6,308,205 B1 | * | 10/2001 | Carcerano et al. | 709/221 |
| 6,339,750 B1 | * | 1/2002 | Hoyer et al. | 702/182 |
| 6,393,472 B1 | * | 5/2002 | Anerousis et al. | 709/223 |
| 6,446,260 B1 | | 9/2002 | Wilde et al. | |
| 6,453,346 B1 | | 9/2002 | Garg et al. | |
| 6,519,683 B2 | | 2/2003 | Samra et al. | |
| 6,664,978 B1 | * | 12/2003 | Kekic et al. | 715/733 |
| 6,788,315 B1 | * | 9/2004 | Kekic et al. | 715/733 |
| 6,839,070 B2 | * | 1/2005 | Meandzija et al. | 715/736 |
| 6,963,911 B2 | * | 11/2005 | Gebhardt, Jr. et al. | 709/223 |
| 7,143,153 B1 | * | 11/2006 | Black et al. | 709/223 |
| 2003/0126256 A1 | * | 7/2003 | Cruickshank et al. | 709/224 |
| 2003/0225876 A1 | * | 12/2003 | Oliver et al. | 709/224 |
| 2004/0006619 A1 | * | 1/2004 | Syed et al. | 709/224 |
| 2004/0024865 A1 | * | 2/2004 | Huang et al. | 709/224 |
| 2004/0146065 A1 | * | 7/2004 | Li et al. | 370/449 |
| 2004/0249931 A1 | * | 12/2004 | Garg et al. | 709/224 |
| 2006/0265353 A1 | * | 11/2006 | Garg et al. | 707/2 |
| 2007/0025389 A1 | * | 2/2007 | Garg et al. | 370/449 |

OTHER PUBLICATIONS

Griffith Kadnier, "Chapter-7: The Event Viewer and Performance Monitor", Book-"Windows NT4: The Complete Reference", pp. 196-226, TataMcGraw-Hill Edition 1998, ISBN 0-07-463222-1,Published by Tata McGraw-Hill Publishing Company Limited, New Delhi, India.

* cited by examiner

*Primary Examiner*—Tammy T Nguyen
(74) *Attorney, Agent, or Firm*—Narendra Reddy Thappeta

(57) ABSTRACT

A network management system in which an administrator may specify attributes of interest, and the specified attributes are monitored. Graphs/reports corresponding to the specified reports may be generated in a single place (e.g., on a web page) such that the data points for the various attributes may be correlated easily. The specified attributes may contain attributes which are dynamically created (e.g., counters measuring various aspects related to instances of objects). The network management system provides the ability to discover such attributes using a suitable interface, and selection of such attributes as well.

32 Claims, 20 Drawing Sheets

```
701  # File      : WinProcess.meta
702  # Description : Metafile for WinProcess 703  [ApplicationInfo]
704  MOTypeId=501046
705  Name='PWinProcess'
706  DisplayName='PWindows Process Monitor'
707  Type=Program
708  ExeName=com.proactivenet.monitors.vamwinperfctrmon.vamwinperfctrmon
709  Version=1.0
710  Schedulable=N
711  OneInstancePerParent=Y
712  AllowRemoteAgent=Y
713  MustRunOnAgent=N
714  OS=6
715  IsNewFramework=Y
716  FrameWorkVersion=2
717  HasCustomizedGUI=Y
718  HasMoreInfo=N
719  SupportDemandPoll=Y
720  IsStatic=Y
```

Fig. 7A

724 [AttributeInfo]
725 AttrId=501046999, UsrAttrId=999,DisplayName='Instance Name',DataType=C,AttrType=I
726 Label=Y,Default='WinProcess501046'

727 [Level 1]
728 MOTypeId=501047,Name='WinProcess',DisplayName='Windows Process Monitor',Autogenerated=N,
729 Schedulable=Y,MustRunOnAgent=N,AllowRemoteAgent=Y,OS=6,HasCustomizedGUI=Y,SupportDemandPoll
730 =Y,StatsPollPeriod=300

731 [AttributeInfo]
732 # Input Predefined attributes
733 AttrId=501047999,UsrAttrId=999,UniqueName=INSTANCE_NAME,DisplayName='Instance
734 Name',DataType=C,AttrType=I,Label=Y, Default='',RequiredOnCreate=N, DisplaySeqNo=1
735 AttrId=501047070,UsrAttrId=70,UniqueName=TARGETIP, DisplayName='Target IP/Host Name',
736 DataType=I,AttrType=I,Label=N,InstanceName=N,DisplayType=IPAddress,Default=-1062730979,DisplaySeq
737 No=3,RequiredOnCreate=Y

Fig. 7B

```
738  # Input attributes
739  AttrId=501047020,UsrAttrId=20,UniqueName=STATS_ATTRIB01,DisplayName='% Privileged Time',
740  InstanceName=Y,DataType=C,AttrType=H,Label=N,Default='Process+java+% Privileged Time';
741  1.0;#;true;RAW',RequiredOnCreate=N,HasListOfChoice=N 742  AttrId=501047021,UsrAttrId=21,UniqueName=STATS_ATTRIB02,DisplayName='% Processor
743  Time',InstanceName=N,DataType=C,AttrType=H,Label=N,Default='Process+java+% Processor
744  Time;1.0;#;false;true;RAW',RequiredOnCreate=N,HasListOfChoice=N 745  AttrId=501047022,UsrAttrId=22,UniqueName=STATS_ATTRIB03,DisplayName='% User
746  Time',InstanceName=N,DataType=C,AttrType=H,Label=N,Default='Process+java+% User
747  Time;1.0;#;false;true;RAW',RequiredOnCreate=N,HasListOfChoice=N 748  AttrId=501047023,UsrAttrId=23,UniqueName=STATS_ATTRIB04,DisplayName='Creating Process
749  ID',InstanceName=N,DataType=C,AttrType=H,Label=N,Default='Process+java+Creating Process
750  ID;1.0;#;false;true;RAW',RequiredOnCreate=N,HasListOfChoice=N
```

Fig. 7C

801  # Output Stat attributes
802  AttrId=5010470072,UsrAttrId=72,UniqueName=STATS01,DisplayName='% Privileged
803  Time',AttrType=S,UOM='#',IsDefaultStats=Y,TableName=WinProcess,ColumnName=STATS01,UseNormalDi
804  stribution=Y,IsDisplayed=Y 805  AttrId=5010470073,UsrAttrId=73,UniqueName=STATS02,DisplayName='% Processor
806  Time',AttrType=S,UOM='#',IsDefaultStats=Y,TableName=WinProcess,ColumnName=STATS02,UseNormalDi
807  stribution=Y,IsDisplayed=Y 808  AttrId=5010470074,UsrAttrId=74,UniqueName=STATS03,DisplayName='% User Time',AttrType=S,
809  UOM='#',IsDefaultStats=N,TableName=WinProcess,ColumnName=STATS03,UseNormalDistribution=Y,IsDis
810  played=Y 811  AttrId=5010470075,UsrAttrId=75,UniqueName=STATS04,DisplayName='Creating Process
812  ID',AttrType=S,UOM='#',IsDefaultStats=N,TableName=WinProcess,ColumnName=STATS04,UseNormalDistri
813  bution=Y,IsDisplayed=Y

Fig. 8A

851  # Input Control attributes

852  AttrId=501047998,UsrAttrId=998,UniqueName=STSPOLLPERIOD,DisplayName='Statistics Poll Interval',
853  DisplayType=Integer,IsDisplayed=Y,AttrMetaType=CNTL,AttrReferenceType= ANY,
854  ScaleFactor=1000,InputOnCreate=Y,InputParm=Y,Autogenerated=N,Editable=Y,RequiredOnCreate=Y,Default=900

855  AttrId=501047995,UsrAttrId=995,UniqueName=COLLECTDATA,DisplayName=Collect
856  Data,DisplayType=Boolean,IsDisplayed=Y,AttrMetaType=CNTL,AttrReferenceType=ANY,ScaleFactor=1000,I
857  nputOnCreate=Y,InputParm=Y,Autogenerated=N,Editable=Y,RequiredOnCreate=Y,Default=1

858  AttrId=501047994,UsrAttrId=994,UniqueName=SRCIP,DisplayName=Source
859  Agent,DisplayType=MOReference,IsDisplayed=Y,AttrMetaType=CFG,MOReferenceType=10000,AttrReferenc
860  eType=ANY,ScaleFactor=1000,InputOnCreate=Y,Autogenerated=Y,Editable=Y,RequiredOnCreate=Y,Display
861  SeqNo=2

862  AttrId=501047993,UsrAttrId=993,UniqueName=PW_MON_VER,DisplayName='Monitor
863  Version',DataType=C,AttrType=C,Label=N 864  AttrId=501047010,UsrAttrId=10,UniqueName=STSPOLLTIMEOUT,DisplayName='Statistics Poll
865  Timeout',DisplayType=Integer,IsDisplayed=Y,AttrMetaType=CNTL,AttrReferenceType=ANY,ScaleFactor=10
866  00,InputOnCreate=Y,InputParm=Y,Autogenerated=N,Editable=Y,RequiredOnCreate=Y,Default=120

Figure 8B

NETWORK MANAGEMENT SYSTEM TO MONITOR MANAGED ELEMENTS

BACKGROUND OF THE INVENTION

1. Field of the Invention

The present invention relates to network management systems, and more specifically to a method and apparatus for enabling a user/administrator to monitor managed elements.

2. Related Art

Networking environments often contain several devices interconnected using networks. Examples of devices include, but not limited to, client machines, web server machines, application server machines, database server machines, etc. Networks in turn are generally implemented using network elements such as routers, bridges, repeaters, and switches connected by various wire-based or wireless mediums. In general, networks provide connectivity between various devices.

Network management systems are used to monitor various attributes in devices and network elements, which (devices and network elements) are together hereafter referred to as 'managed elements'. An attribute generally refers to an entity, the status or a related statistic of which can be determined. Examples of attributes include, but not limited to, operational status of device/network element (or an interface thereon), the utilization (processing power, number of bytes transferred) of disk space/processor/interface, etc., as is well known in the relevant arts.

Vendors often provide network management systems, which monitor and display several attributes. In one prior approach, a vendor determines the attributes of possible interest to users (e.g., administrators or managers), and implements a network management system to retrieve data points of the attributes and display the corresponding data points using a suitable interface. One advantage of such an approach is that the users are provided information of possible interest without requiring substantial configuration.

However, one disadvantage of the approach is that the attributes of possible interest determined by a vendor may not precisely match the actual interest of at least some users. Accordingly, a corresponding network management system may not be entirely suitable to such users. In addition, the attributes of possible interest may not be known/available at a time the network management system is implemented.

BRIEF DESCRIPTION OF THE DRAWINGS

The present invention will be described with reference to the accompanying drawings, wherein:

FIGS. 7A-7C together contain a portion of a meta-file which is used to represent the data entered to define a monitor type in one embodiment.

FIGS. 8A and 8B contains text representing the data which may be sent to a monitor instance for sending back polled data points to a network management station.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview

A network management system according to an aspect of the present invention enables an administrator (or user) to specify attributes of interest, and to later view the data points related to the attributes. As a result, users may customize the attributes of interest and monitor only such attributes. According to another aspect of the present invention, a convenient interface is provided for a user to discover and display attributes of dynamically created managed entities. The user can then merely select the attributes to cause the selected attributes to be monitored.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the invention.

2. Example Environment

Figure 1:
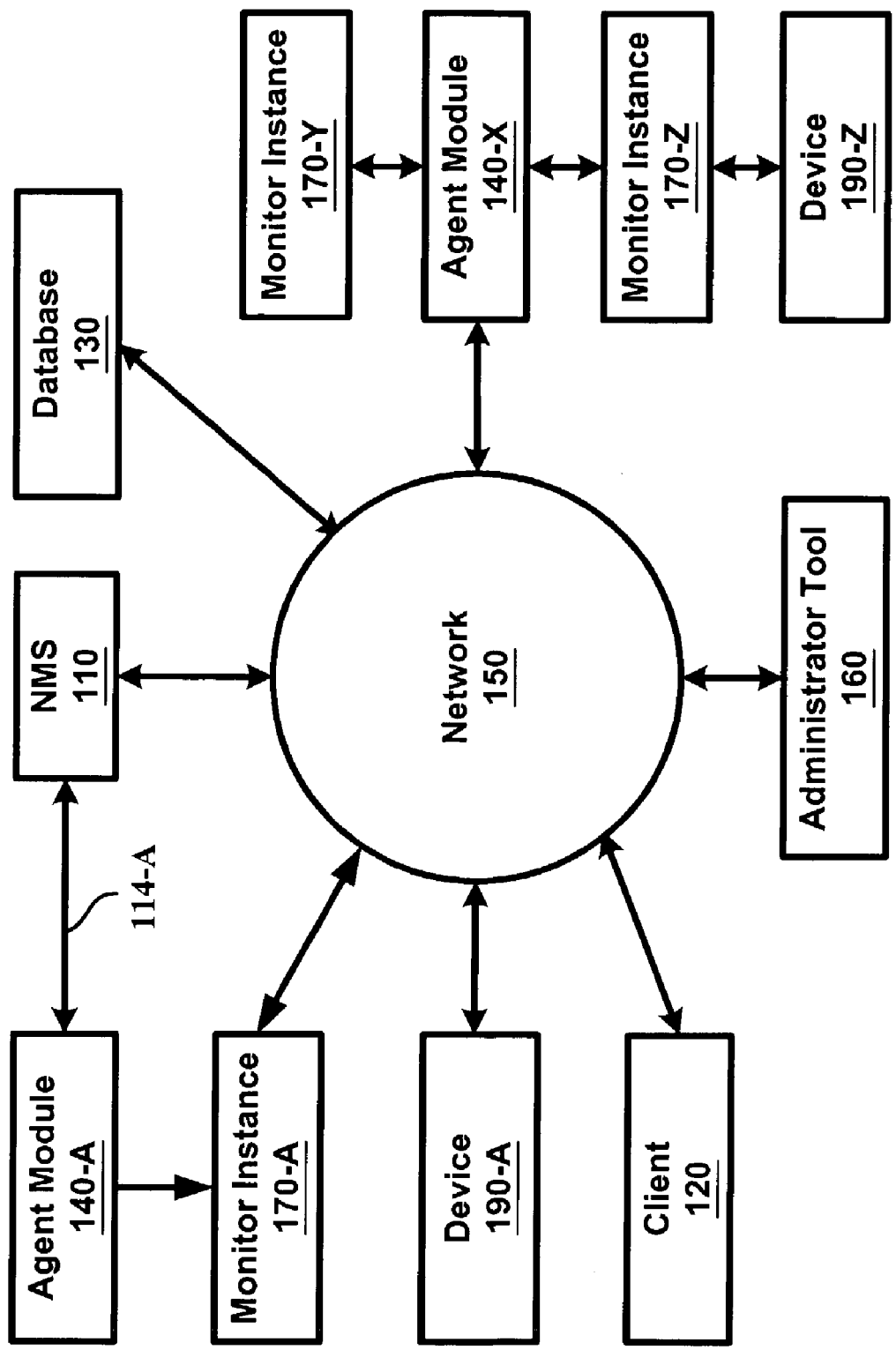
FIG. 1 is a block diagram illustrating an example environment in which the present invention can be implemented.

FIG. 1 is a block diagram illustrating an example environment in which the present invention can be implemented. The environment is shown containing network management station (NMS) 110, client 120, database 130, agent modules 140-A and 140-X, network 150, administrator tool 160, monitor instances 170-A, 170-Y and 170-Z, and devices 190-A and 190-Z. NMS 110, database 130, monitor instances 170-A, 170-Y and 170-Z, and agent modules 140-A and 140-X (or just the software/tools necessary to define/edit/instantiate the monitor instances) may together be viewed as forming a network management system. Each component of FIG. 1 is described below in further detail.

It should be appreciated that only a few representative systems and components are shown in FIG. 1 for illustration. However, typical environments contain several more (types) devices, agent modules, clients, etc. Similarly, for simplicity, several of the components are shown connected by a single network 150 or by point-to-point connections. The components can be connected using several disparate networks which are implemented in different administrative domains (e.g., Intranet, Internet, departmental network) and using different technologies.

In addition, agent modules and monitor instances are shown as separate blocks merely for clarity. The two blocks can be implemented within NMS 110, within a device being monitored, and/or in a separate machine dedicated for monitoring of devices. The specific hardware on which the blocks are implemented may be referred to as a monitor server. Thus, the monitor server may be integrated with NMS 110 or the device being monitored, or be implemented as a separate machine. All such implementations are contemplated to be within the scope and spirit of various aspects of the present invention.

Devices 190-A and 190-Z represent (or contain) example managed elements, which are used to illustrate several aspects of the present invention. Each device may correspond to an element such as a server (e.g., web server, database server, network cache). However, for illustration, it is assumed that device 190-Z contains managed entities which are dynamically created, and thus need to be monitored. Device 190-Z may correspond to a Windows NT server 4.0 (available from Microsoft Corporation) executing on one of several commercially available machines, and the managed entities may correspond to instances of objects.

Agent modules 140-A and 140-X may be implemented to facilitate the instantiation of monitor instances according to various aspects of the present invention. In addition, tasks such as changing of control parameters (e.g., polling frequency), forwarding the data points polled for various attributes, etc., may be performed using communication from NMS 110. Agent module 140-A is shown interfacing with monitor instance 170-A, and agent module 140-X is shown interfacing with monitor instances 170-Y and 170-Z, merely for illustration.

Monitor instance 170-Z may be configured to indicate the attributes (including the specific managed element on which the attribute is present) which need to be monitored, and any related control parameters (e.g., polling frequency, timeouts). Monitor instance 170-Z may accordingly poll device 190-Z at the specified frequency, and send corresponding data points to NMS 110 via agent module 140-X. A timeout value for each poll may be specified by data received from NMS 110. Only monitor instance 170-Z is described below for conciseness, however the description may be applicable to other monitor instances as well.

To provide the above features, each agent module is provided the ability (compatible network protocol, medium interface, etc.) to communicate with NMS 110 and the monitor instance is provided the ability to communicate with corresponding managed elements sought to be managed. Thus, assuming for illustration that monitor instances 170-A and 170-Z are respectively used to monitor attributes in devices 190-A and 190-Z, monitor instance 170-A may communicate with device 190-A on network 150 (using IP) and monitor instance 170-Z may communicate with device 190-Z using potentially a proprietary protocol. Similarly, each agent module may communicate with NMS 110 on network 150 (using IP) or through other mechanism (as illustrated with point-to-point path 114-A).

An aspect of the present invention enables a user to define a new monitor instance to monitor various attributes as described in sections below in detail. Thus, some of the monitor types may be provided by a vendor providing NMS 110, and some monitor types may be defined by a user dynamically as described below.

Administrator tool 160 is used by an administrator to configure and instantiate various monitor instances. Administrator tool 160 may be integrated into NMS 110 as one unit. However, for ease of administration, administration tool may be provided from various client systems (120). The manner in which a user may define monitor types and instantiate new monitor instances according to various aspects of the present invention, is described below in further detail. In an embodiment, the user may further group the monitors in various hierarchical menus such that navigation through the monitors is further simplified.

NMS 110 is used in conjunction with database 130 for several of the operations described above. Briefly, NMS 110 interfaces with administrator tool 160 to enable creation of new monitor types, configuration and instantiation of configured monitor types. In addition, NMS 110 may selectively store in database 130 all or some of the data points (or summary thereof) received from the monitor types. Also, NMS 110 may allow a user to access various reports generated based on the stored data points. The architecture view of an example embodiment of NMS 110 is described below in further detail.

3. Network Management Station (NMS)

Figure 2:
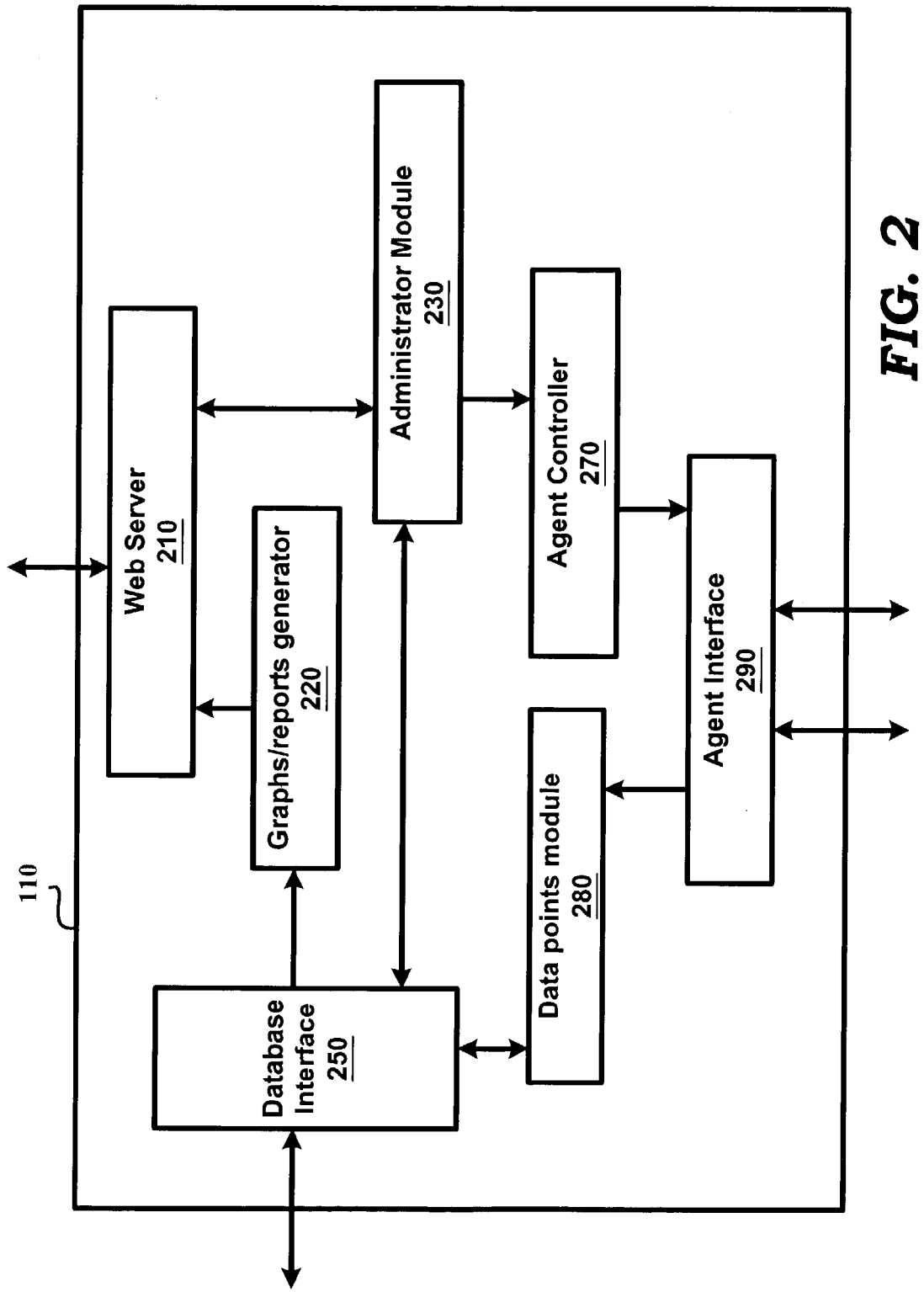
FIG. 2 is a block diagram illustrating the details of a network monitoring system in an embodiment of the present invention.

FIG. 2 is a block diagram illustrating the details of NMS 110 in one embodiment. NMS 110 is shown containing web server 210, graphs/reports generator 220, administrator module 230, database interface 250, agent controller 270, data points module 280, and agent interface 290. Each component is generally implemented by hardware executing appropriate software/firmware, and is described below in further detail.

Web server 210 provides interface to client 120 and administrator tool 160 to interact with other modules in NMS 110. In an embodiment, a request for a web page is received in the form of a URL and associated parameters, and web server 210 communicates with an application server (not shown) to provide the appropriate interface for client 120 and administrator tool 160. The application server may be implemented to contain graphs/reports generator 220 and administrator module 230. Web server 210 and the application server may be implemented using products available in the market-place as will be apparent to one skilled in the relevant arts.

Administrator module 230 provides appropriate interface for administrator tool 160 to enable an administrator to define, configure and instantiate monitor instances according to various aspects of the present invention. Administrator module 230 generates the appropriate database schemas, and configures database 130 corresponding to any monitor types/instances defined according to various aspects of the present invention. In general, administrator module 230 may be used to specify the manner in which data points related to an attribute need to be displayed, and graphs/reports generator 220 displays the data points accordingly.

Graphs/reports generator 220 retrieves from database 130 (by interfacing through database interface 250) various data points corresponding to attributes sought to be monitored, and displays data points. Data representing the requested graphs and reports may be generated, and provided to web server 210 for display in the form of web pages. The operation of graphs/reports generator 220 and administrator module 230 is described with reference to example(s) below.

Data points module 280 receives various data points related to attributes being monitored by the corresponding monitor instances, and determines the manner in which the data points need to be processed. At least some of the data points may be stored in database 130 by communicating with database interface 250. The number of data points stored may be reduced and/or alarms logged, for example, as described in U.S. Pat. No. 6,453,346 issued to Garg et al, which is incorporated in its entirety into the present application.

Agent controller 270 operates under the control of administrator tool 160 (via administrator module 230) to instantiate various monitor instances, and to provide the appropriate configuration parameters. In general, each monitor instance may be provided information indicating the specific attributes to be monitored, polling frequency, timeout value for each poll, etc., in addition to the program logic enabling the monitor instance to poll the device for the data point. Agent interface 290 enables communication with each of the monitor instances according to the specific medium/protocol using which the monitor instance can be contacted.

The description is continued with reference to the manner in which several aspects of the present invention may be implemented in the embodiment(s) described above.

4. Monitoring Newly Available Attributes

Figure 3A:
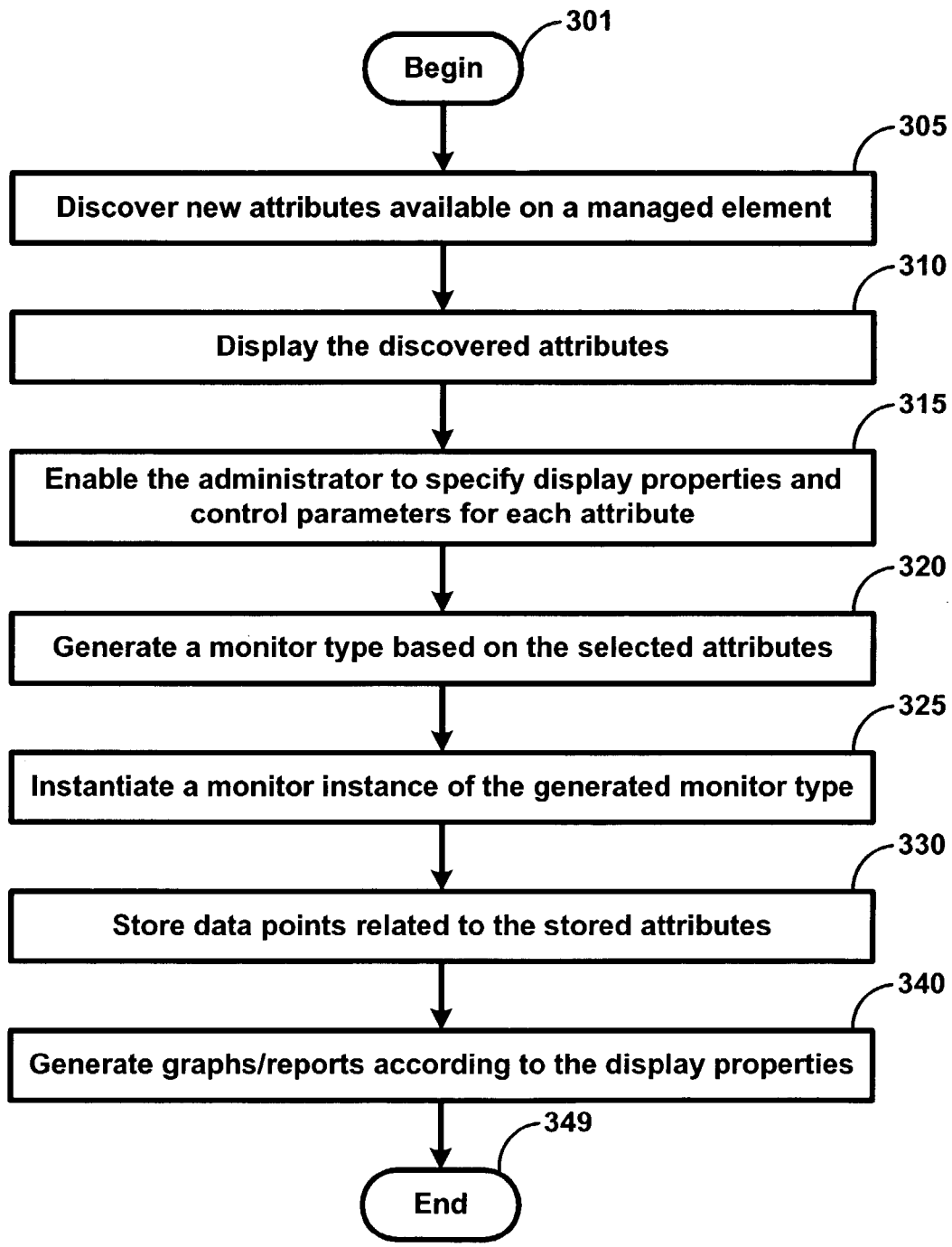
FIG. 3A is a flow chart illustrating the manner in which an administrator can specify attributes of interest for monitoring according to an aspect of the present invention.

FIG. 3A is a flow-chart illustrating the manner in which an embodiment of a network management system enables users to monitor newly available attributes (not necessarily present when the network management system is shipped) according to an aspect of the present invention. The flow-chart is described with reference to FIGS. 1 and 2 merely for illustration. However, the method can be implemented in other environments as will be apparent to one skilled in the relevant arts based on the disclosure provided herein. Such other implementation are also contemplated to be within the scope and spirit of various aspects of the present invention. The flow-chart begins in step 301, in which control immediately passes to step 305.

In step 305, new attributes available on a managed element may be discovered (from administrator tool 160 after appropriate authentication of the administrator). The managed element may need to be specified by the administrator trying to define the new monitor type (or the attributes sought to be monitored therein). Thus, a suitable interface may be provided to enable the specific managed element from which to discover the attributes.

In step 310, administrator tool 160 displays the discovered attributes, again using a suitable interface. In an embodiment described below with reference to FIGS. 4A-4C, the display depends on the type of managed entity providing the display attributes to enhance the user-friendliness of the interface.

In step 315, administrator tool 160 enables the administrator to specify display properties and control parameters for each attribute. The display properties may include the specific 'label' (usually descriptive) to be associated with the display of the attribute, the units of measurement/display, etc. As described below, the data points for the attribute are then displayed according to the specified display properties. The control parameters in turn specify aspects such as polling frequency and poll timeouts, as noted in sections above also.

In step 320, administrator tool 160 generates a monitor type based on the selected attributes. In general, generating a monitor type entails storing the appropriate data representing the various attributes and the associated information, and enabling administrators at least to later access the monitor type to either further edit it, or to instantiate an instance of the corresponding monitor type. The manner in which monitor types may be supported is described in further detail with reference to examples in sections below.

In step 325, administrator tool 160 enables an administrator to instantiate a monitor instance of the monitor type defined earlier. As many instances as is desirable (usually associated with different managed entities) may be instantiated at a time convenient for the administrator. The administrator may be provided the further option of changing aspects such as display properties and control parameters for the specific instance being instantiated. In addition, when the identifiers of attributes depend on the specific instances of managed entities (e.g., objects), the user interface may permit the administrator to apply a monitor type to monitor such attributes as well as described below with examples.

In step 330, the instantiated monitor instance polls and stores data points related to the associated attributes. As noted above, the monitor instance needs to be provided the ability to communicate with the monitored device to enable such polling. In an embodiment, all monitor instances are implemented to communicate with devices which are already provided with the ability to respond to polling requests according to pre-defined interface(s), and thus monitor instances merely need to send poll requests consistent with the corresponding interface to receive each data point for a monitored attribute.

In step 340, graphs/reports generator 220 generates graphs/reports based on the data available in database 130 in response to corresponding request received from client 120. Each graph/report may be generated (by default) according to the display properties specified in step 315. The method then ends in step 349.

Thus, the method of 3A illustrates the manner in which newly available attributes may be monitored in an embodiment of the present invention. However, it may be desirable to provide the administrator the ability to select only specific attributes to monitor. Such ability to select specific attributes may be desirable in other environments (independent of ability to monitor newly available attributes). The manner in which such a feature may be provided is described below with additional examples.

5. Enabling Administrator to Select Specific Attributes to Monitor

Figure 3B:
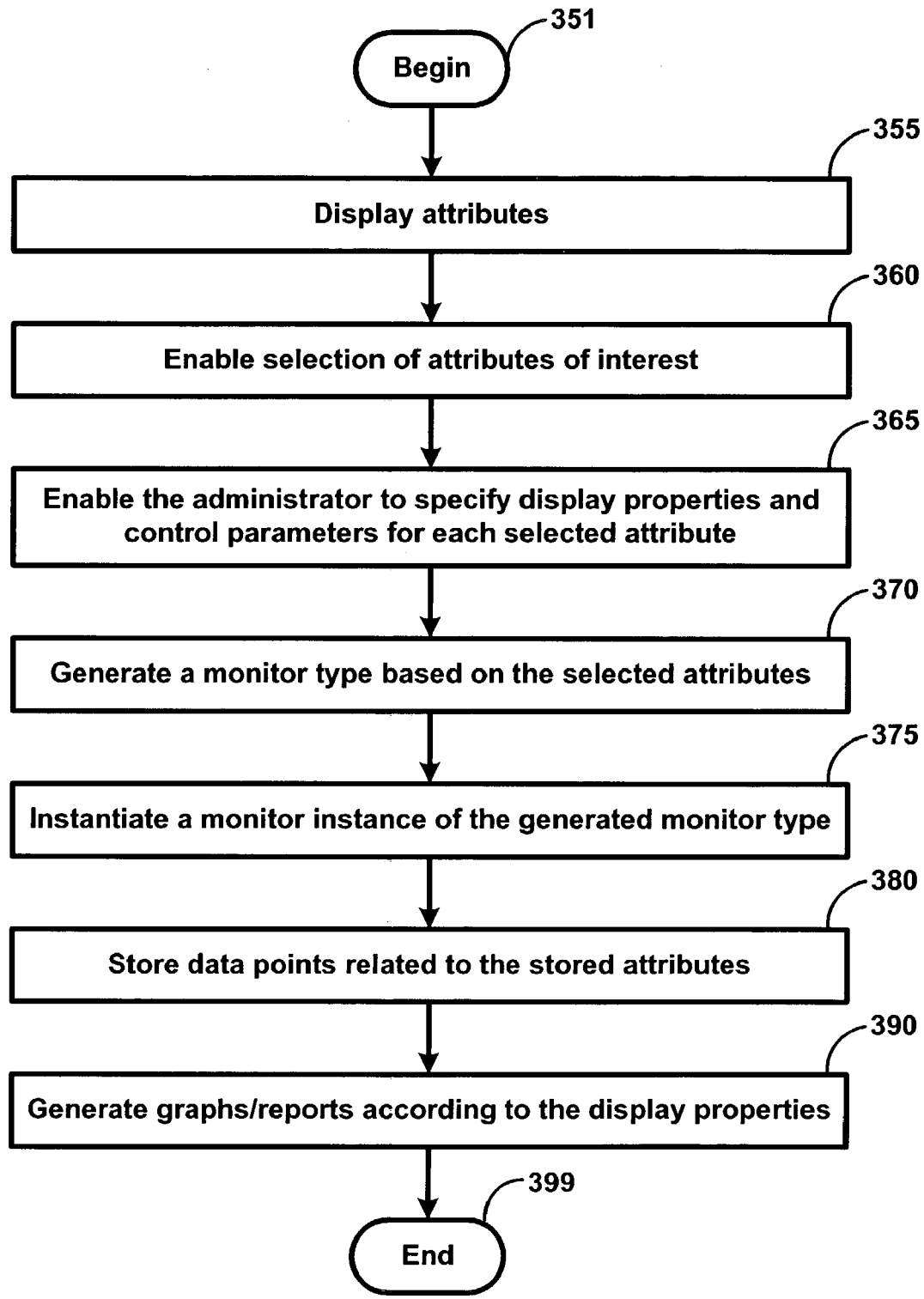
FIG. 3B is a flow chart illustrating the manner in which an administrator can enable monitoring of attributes of managed entities that are dynamically created (which may not be available when a network management system is initially deployed).

FIG. 3B is a flow chart illustrating the manner in which a network management system may enable an administrator to select and monitor attributes of interest. The flow-chart is again described with reference to FIGS. 1 and 2 for illustration. The flow-chart can be implemented in other environments as well, as will be apparent to one skilled in the relevant arts by reading the disclosure provided herein. Such other implementation are also contemplated to be within the scope and spirit of various aspects of the present invention. The method begins in step 351, in which control immediately passes to step 355.

In step 355, administrator tool 160 displays various attributes which may be monitored using a network management system provided according to an aspect of the present invention. In step 360, administrator tool 160 enables an administrator to select attributes of interest. Any suitable user interface may be used to provide a display and enable selection.

In step 365, administrator tool 160 enables the administrator to specify display properties and control parameters for each selected attribute. In step 370, administrator tool 160 generates a monitor type based on the selected attributes. Steps 365 and 370 may be performed similar to steps 315 and 320 of FIG. 3A. Similarly, steps 375, 380 and 390 may be performed similar to steps 325, 330 and 340 described above. The method of FIG. 3B ends in step 399.

Thus, an aspect of the present invention enables convenient monitoring of only the desired attributes. Various user interfaces may be implemented to provide the features described above with reference to FIGS. 3A and 3B. An example user interface, which provides various features described in both the figures is described below for illustration.

6. User Interface for Defining Monitor Type

Figure 4A:
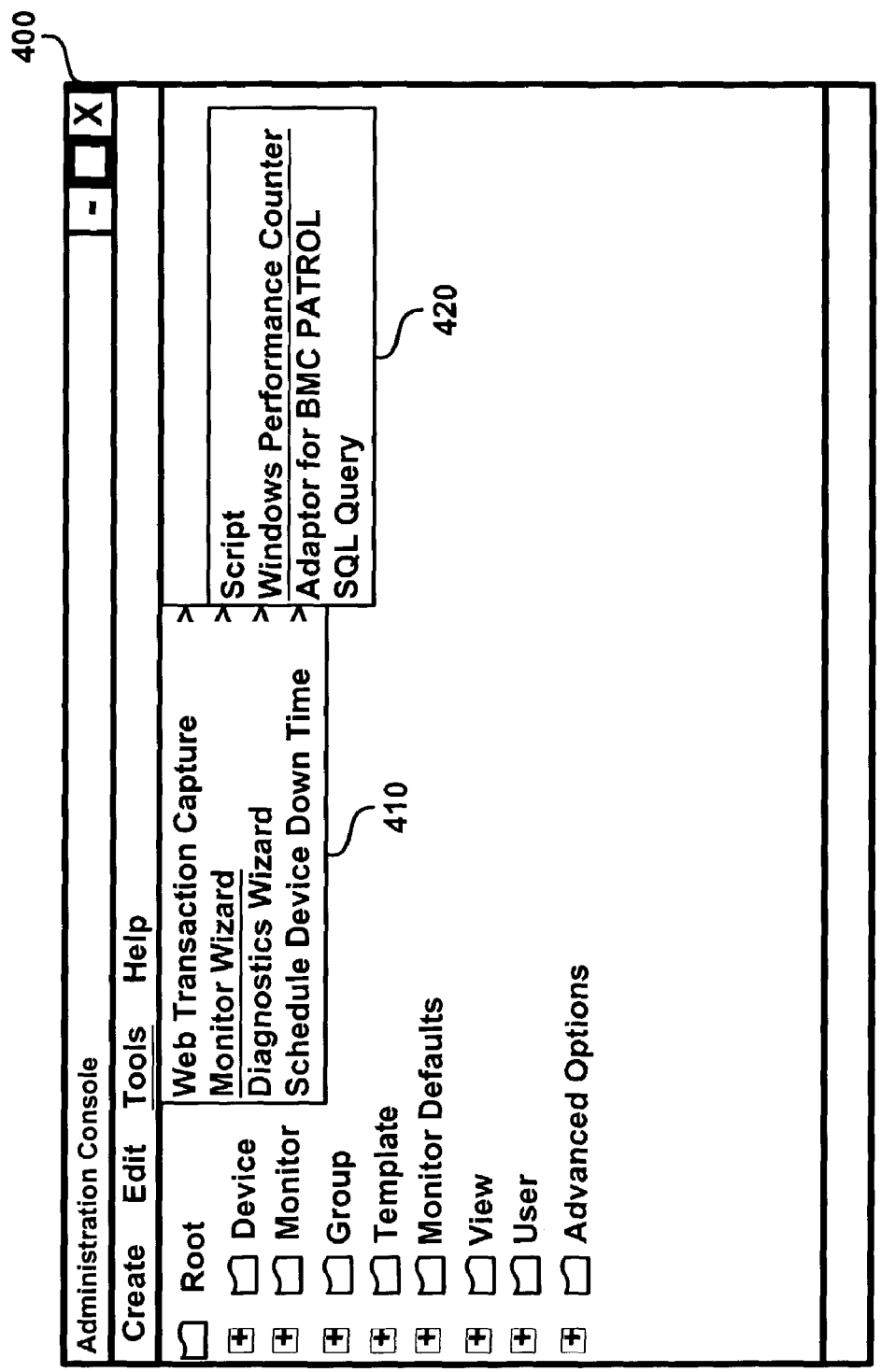
FIG. 4A contains a display screen illustrating the manner in which an administrator may select a monitoring domain in which a monitor type is to be defined in one embodiment.
Figure 4B:
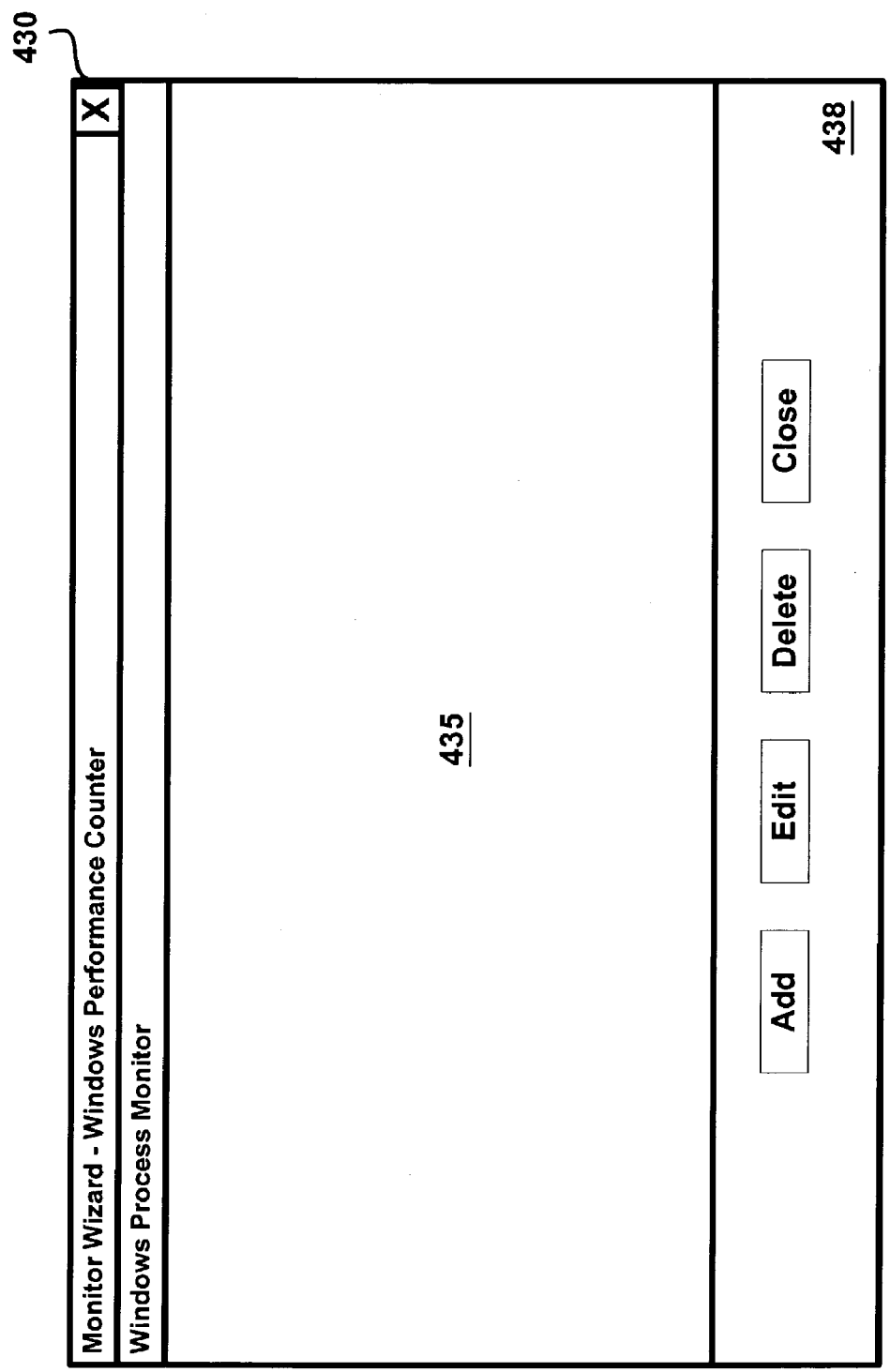
FIG. 4B contains a display screen illustrating the manner in which pre-existing monitor types in a monitor domain can be displayed enabling editing, adding or deleting of a monitor type in the monitor domain in one embodiment.
Figure 4C:
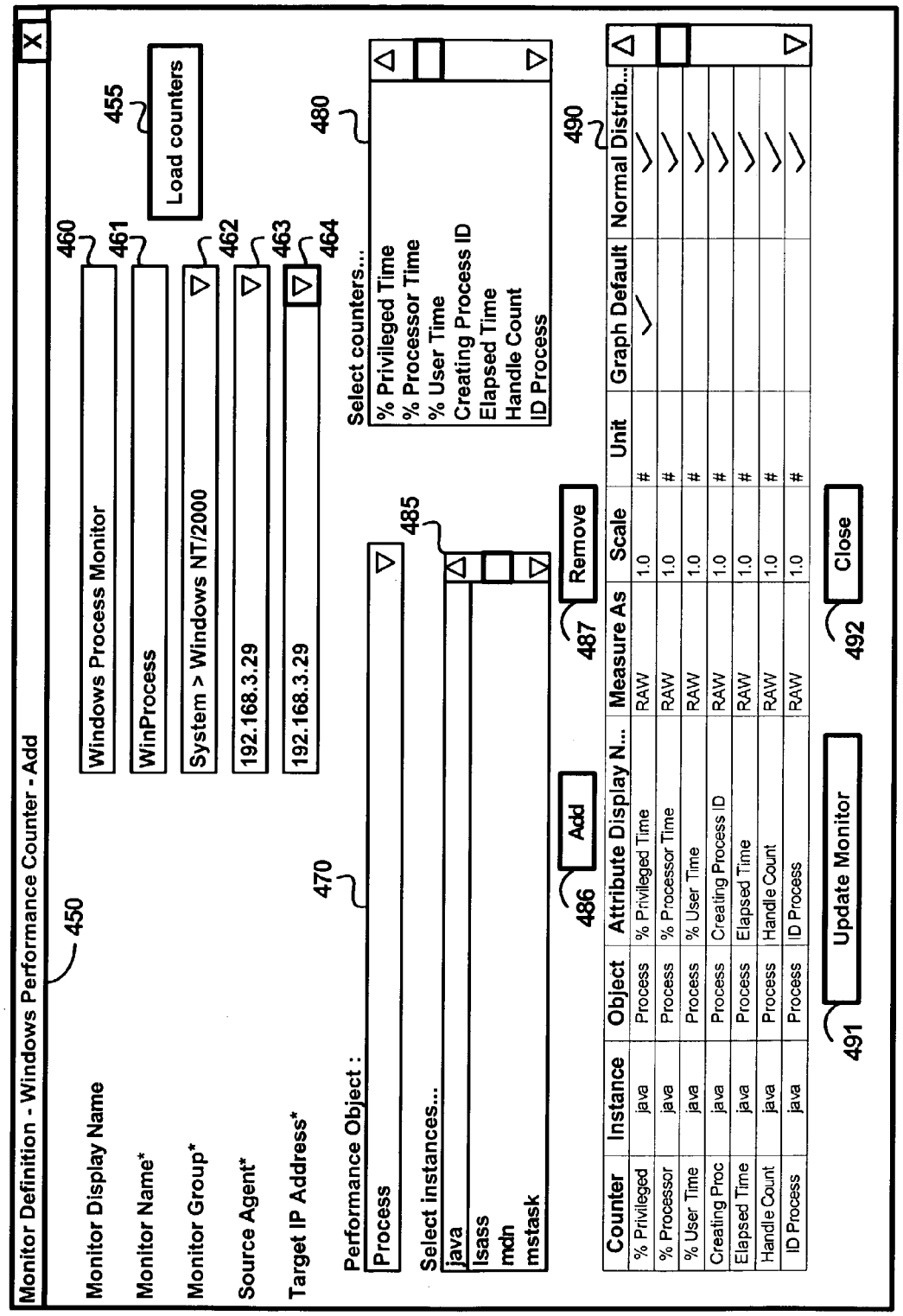
FIG. 4C contains a display screen illustrating the manner in which attributes of dynamically created managed entities may be discovered and selected for later monitoring in one embodiment.

FIGS. 4A, 4B and 4C contain various screens which may be displayed by administrator tool 160 when an administrator defines a monitor type, for example, as described above with reference to FIGS. 3A and 3B. Each screen is described below in further detail. Only the details as relevant to various features of the present invention are described for conciseness.

FIG. 4A depicts administration console 400, in which the administrator has selected 'Monitor Wizard' sub-option in pop-up menu 410 generated in response to selection of the 'Tools' option. The monitor wizard sub-option enables definition of new monitor types (or editing/deletion of various pre-existing monitor types) in a monitor domain. Monitor domain generally refers to the data access mechanism/interface used to collect data from a managed element. Example monitor domains include SNMP (Simple Network Management Protocol), CIM (Common Information Model), Windows Performance Counters (on a Microsoft Windows platform), etc.

The selection of 'Monitor Wizard' sub-option causes pop-up menu 420 to be displayed, which displays the various monitor domains available for definition of a new monitor type. Assuming for illustration, the administrator selects 'Windows Performance Counter' (an example monitor domain) in pop-up menu 420, window 430 of FIG. 4B may be displayed. Area 435 in window 430 may contain the various instances of monitor types defined for the windows performance counter. Accordingly, area 438 is shown options containing buttons to Add, Edit, Delete, and Close. The edit and delete options may be used with pre-existing type instances.

Assuming the administrator selects 'Add' option in area 438, window 450 of FIG. 4C may be displayed. As may be appreciated, the layout of screen 450 is designed to be suitable for displaying the newly available attributes. The administrator may enter a suitable display label (that will be displayed when displaying graphs and reports) in field 460, a text identifier for the type instance (which is later displayed in area 435 of FIG. 4B). The value in field 462 represents the organization of various monitor types hierarchically (there in 'Windows NT/2000' group which is below System group), and is specified by the administrator.

The administrator may also enter a unique name in field 461, which may then be used to identify the corresponding database schema and table name for this monitor type in database 130. NMS 110 may validate this unique name during monitor type definition to ensure that it is unique within the system and conforms to certain naming conventions (e.g., name cannot have blank spaces or special characters, name cannot begin with numeric value, etc.). The unique name thus created may be stored (e.g., in line 705 of the meta file illustrated later in FIG. 7A).

To discover the newly available attributes, the administrator enters in field 464 the address (target IP address) of a device from which the attribute types are discoverable, and then clicks on load counters button 455. In an embodiment implemented in the context of Windows NT/2000 servers, the objects (sought to be monitored) are retrieved and made available in pull-down menu 470. The specific object of interest is selected by operating pull-down menu 470. The objects may be retrieved for example, using PDH interface described in further detail in a book entitled, "Windows NT Performance Monitoring, Benchmarking, and Tuning" by Mark Edmead (New Riders Publishing, November 1998, ISBN 1562059424).

The process object is shown selected in pull-down menu 470. The corresponding active instances are shown in scroll bar area 485. When an instance is selected, the corresponding available counters (attributes) are displayed in scroll bar area 480. The administrator selects each attribute of interest by first highlighting the attribute, and then clicking on add button 486. The selected attributes are displayed in scroll bar area 490. Remove button 487 can be used to remove a previously selected attribute.

The administrator may define various display properties associated with each selected attribute, and the corresponding columns are also shown in scroll bar area 490. Counter column contains the name of the attribute (specified according to standards) in scroll bar area 480. The 'measure as' column indicates the form of data that is collected for use in data analytics and display (e.g., graphs, reports, etc.). The common options are raw form ('as is' value of the counter), delta form (difference from a previous value of the counter), and rate form (delta divided by some time interval), where the use of a particular form of data helps provide improved analytics or better understandability of graphs and reports.

The scale factor indicates a factor by which each data point is to be multiplied for purposes of display and is included in 'Scale' column. The unit column indicates the unit of measurement. The symbol # indicates that a dimensionless number is stored, e.g., count of threads, % CPU utilization, etc. Other possible options include dimensional numbers to indicate a rated value, e.g., memory growth/unit time, connections opened/unit time, etc. The 'Graph Default' option indicates whether the attribute is to be included by default in any graph display (described in further detail with reference to FIGS. 6A and 6B).

'Normal Distribution' column specifies whether the data points for the attribute are expected to follow a normal distribution (for computation to generate alarms when there is substantial deviation from the expected patterns). Other possible patterns include Poisson Distribution, etc., which are well known in the relevant arts.

Once the administrator is done with selecting the newly available attributes of interest and specifying the display attribute, update monitor button 491 may be clicked on to update the information (representing the monitor type instance) in database 130. It should be appreciated the interface of FIGS. 4A-4C is designed to be suitable for the specific examples described above. However, different interfaces may be provided as is suitable for the specific environment. The description is continued with reference to an example interface for instantiation of a monitor instance using the monitor type defined above.

7. User Interface for Instantiating a Monitor Instance

FIGS. 5A through 5E contain screens, which together illustrate an example user interface for instantiating a monitor instance. Only the portions of the screen as relevant to an understanding of the embodiment(s) are described for conciseness. When an administrator logs on (after proper authentication), screen 500 of FIG. 5A may be displayed. Alternatively, the screen may be accessed using the appropriate URL.

It may be noted that the detailed entries for 'Remote Agent' in area 509 indicate the specific locations where agent modules are installed. In an embodiment described in further detail, each agent module is provided the ability to receive data indicating the specific attributes to be monitored and control parameters, in addition to program logic for retrieving data points for specific device types. The program and logic are used during instantiation of monitor instances later.

Figure 5A:
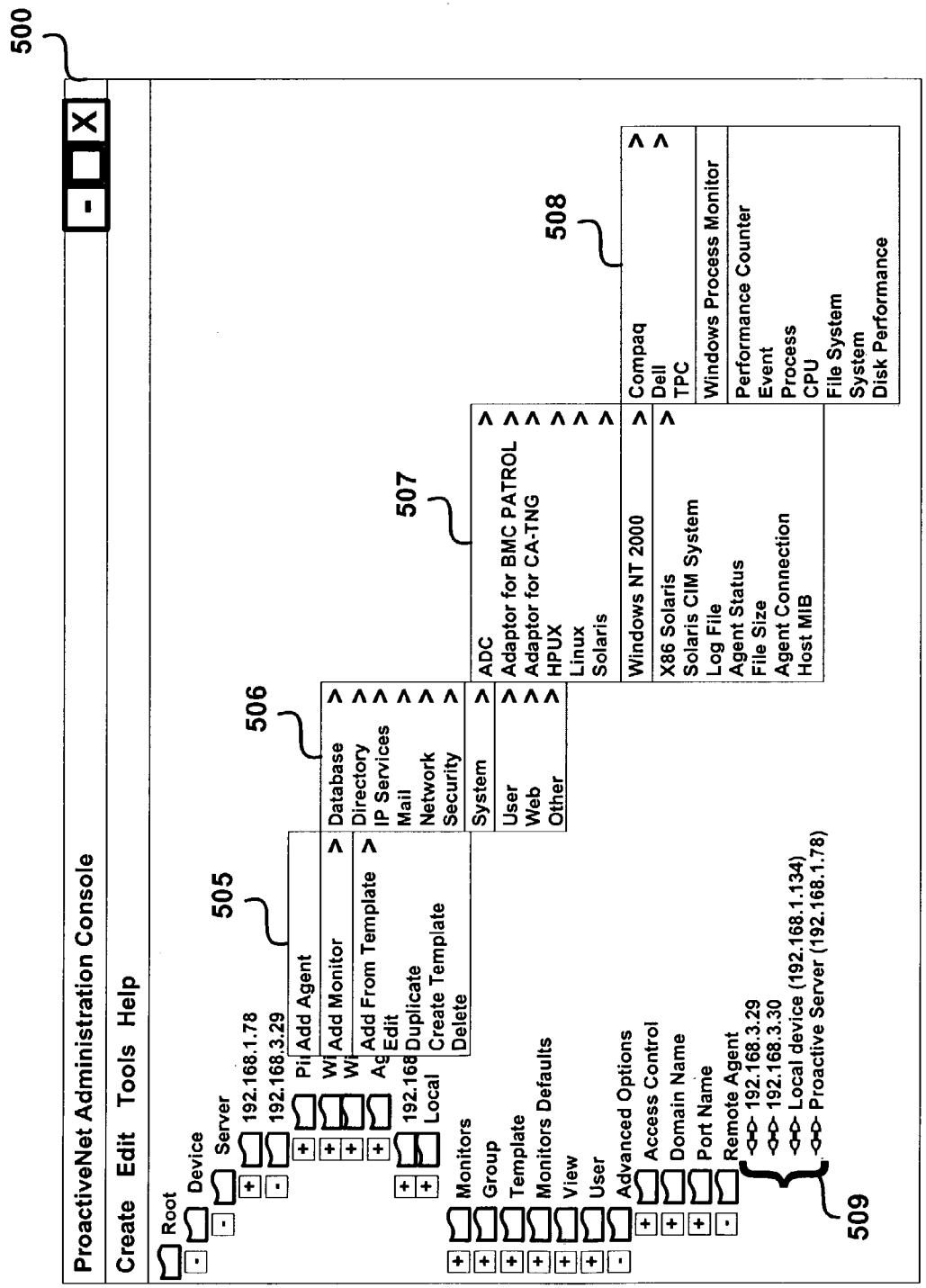
FIG. 5A contains a display screen illustrating the manner in which an administrator may access a previously defined monitor type to instantiate a new monitor instance in one embodiment.

Continuing with the manner in which the screen of FIG. 5A can be used, an administrator selects the "Add Monitor", "System", "Windows NT/2000" and "Windows Process Monitor" in successive pop-up windows 505, 506, 507 and 508 respectively. It may be appreciated that the selection sequence corresponds to the information specified in field 462 in FIG. 4C. Window 520 of FIG. 5B is displayed as a result.

Figure 5B:
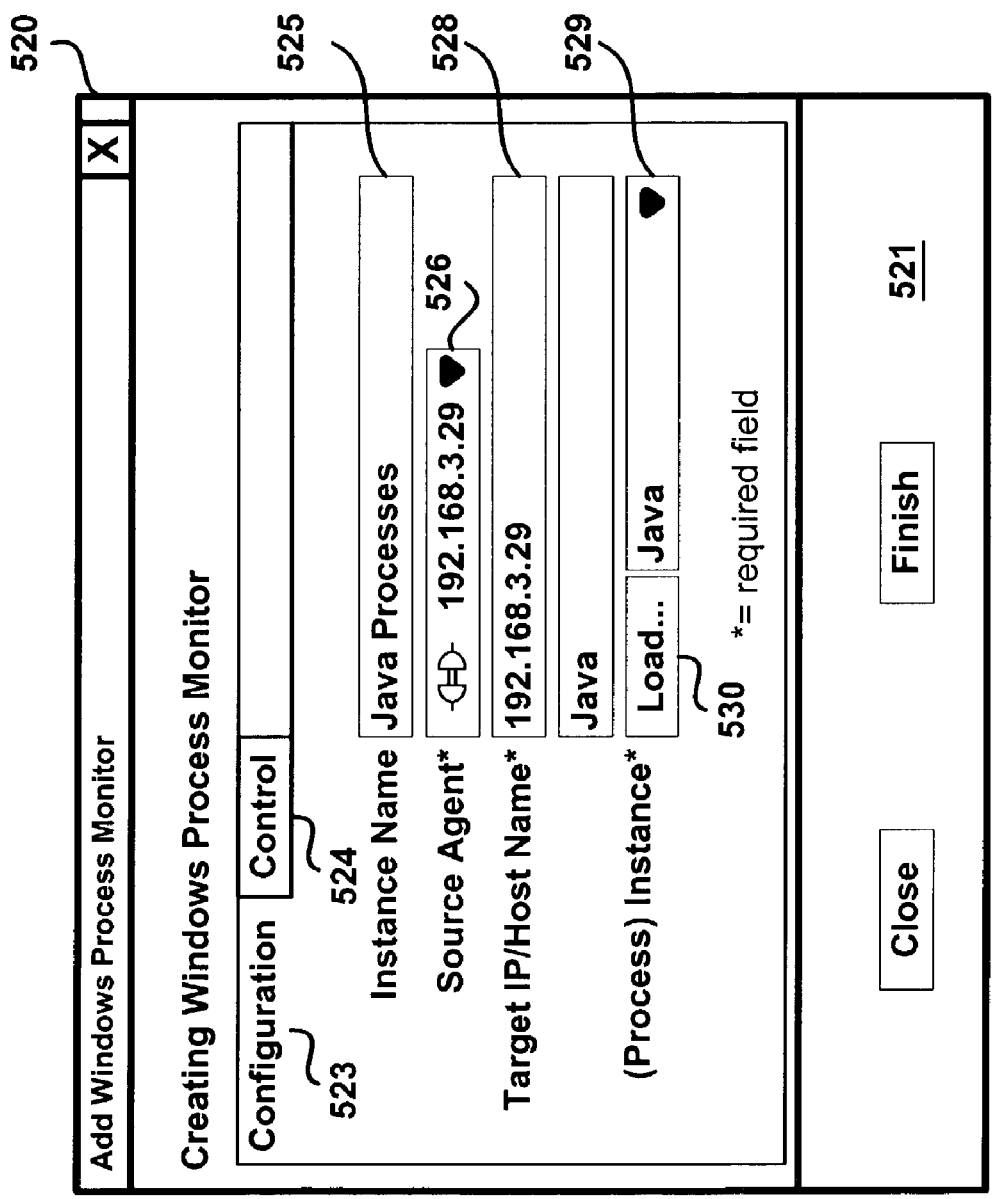
FIG. 5B contains a display screen illustrating the manner in which an administrator may use a previously defined monitor type to monitor attributes of dynamically created managed entity in one embodiment.

With reference to FIG. 5B (configuration tab 523 selected by default), the administrator may provide a unique name for the monitor instance (here, "Java Processes") in field 525. Source agent field 526 contains the default address (of field 463 of FIG. 4C), which was specified while defining the monitor type. The address may be modified if the monitor instance is to be instantiated on some other machine by specifying the corresponding new address. The list of such machines is provided in area 509 as noted above. Similarly, the IP address of the target machine on which the attributes are to be monitored, is specified in field 528.

All the instances of objects selected in FIG. 4C are available for monitoring. Additional instances may be discovered by clicking on load button 530. The list thus discovered may be accessible via list-down menu 529, and one of the object instances may be selected (instead of the Java instance). As the selected instance is of the same object type as the instances selected in FIG. 4C, the attributes corresponding to such new instances also can be monitored.

The user may specify control attributes (to control polling behavior) by selecting control tab 524 as described below with reference to FIG. 5C.

Figure 5C:
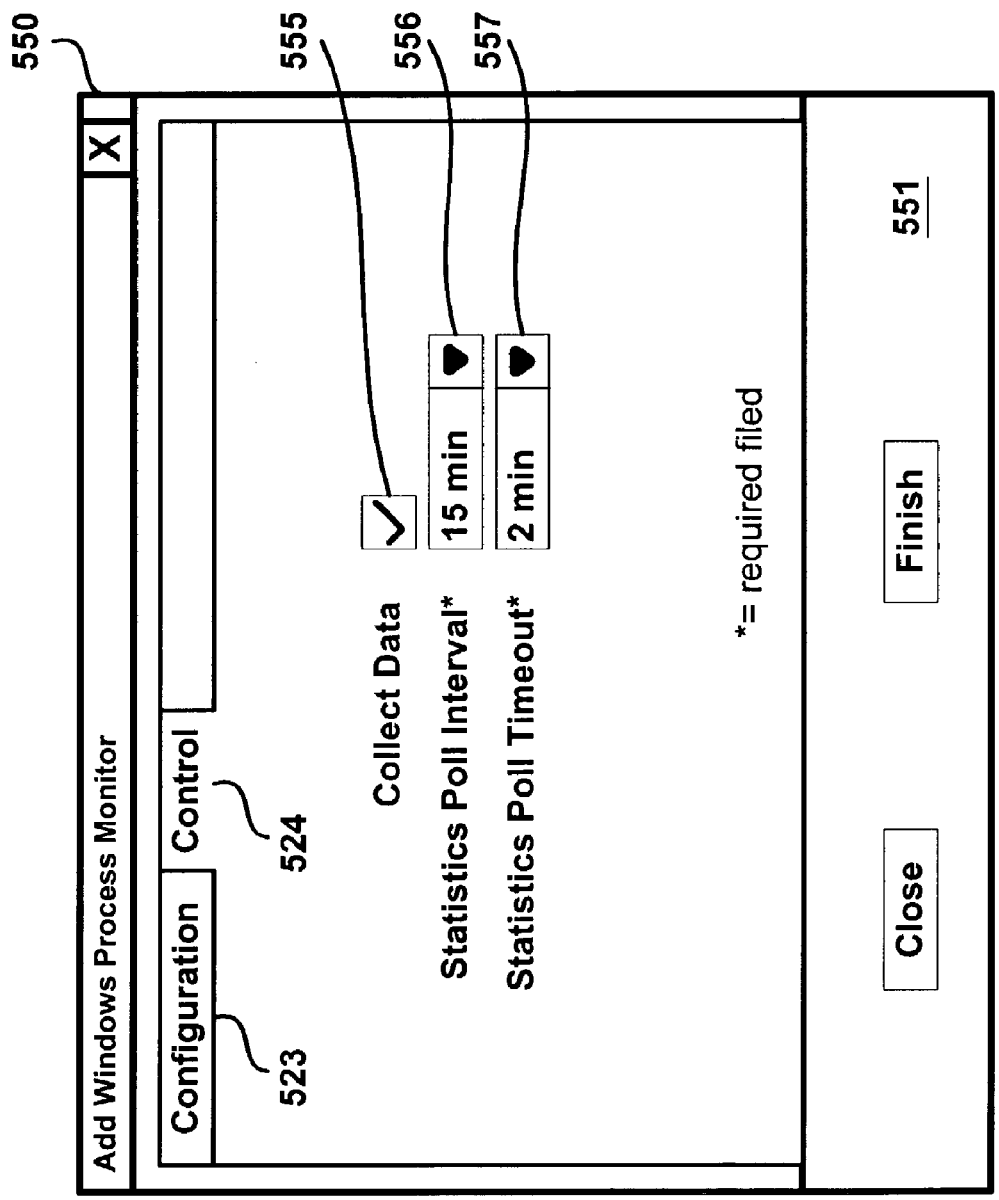
FIG. 5C contains a display screen illustrating the manner in which an administrator may specify control attributes to determine the poll (data collection) behavior of a monitor instance in one embodiment.

With reference to window 550 of FIG. 5C, drop-down box 556 is used to indicate the poll interval value which specifies the frequency with which the monitor instance will send poll requests to obtain counter values for attributes defined in the monitor type. Drop-down box 557 contains the poll timeout value which specifies the duration of time after which a poll will timeout (and return 'no data' value) if the monitor instance cannot complete the poll for some reason (e.g., managed element which is being monitored is temporarily not accessible from the network).

Check-box 555 contains a flag to indicate if data collection should be enabled for the monitor instance. Data collection may be disabled from time to time for various administrative reasons (e.g., if the managed element which is being monitored is temporarily brought down for maintenance purposes). Once the administrator is done with the selection of FIG. 5B and specifying poll attributes of FIG. 5C, the finish button (shown in area 551) may be clicked on.

Figure 5D:
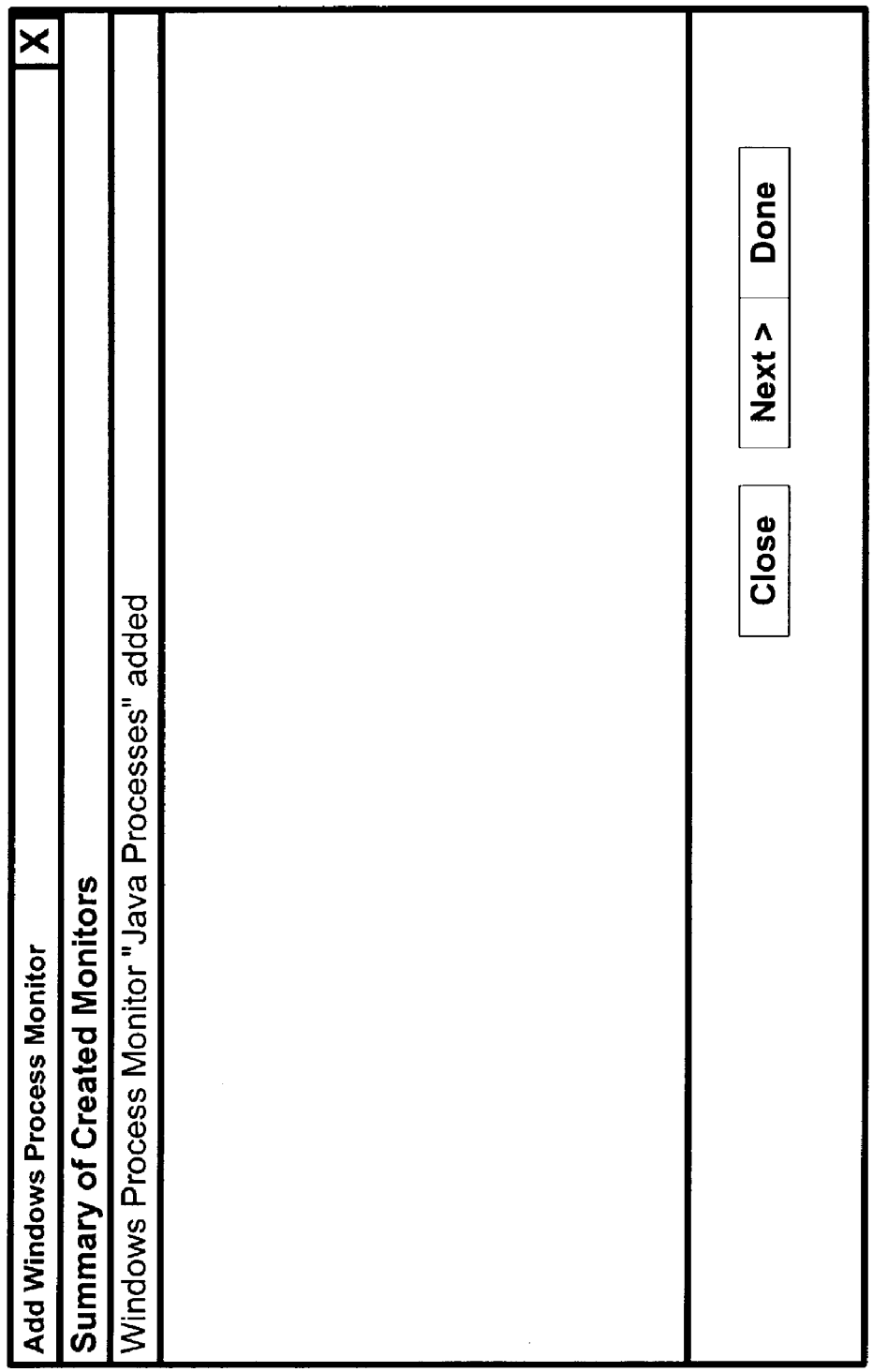
FIG. 5D contains a display screen illustrating the confirmation message that may be generated on successful instantiation of a monitor instance in one embodiment.

Administrator tool 160 causes the monitor instance to be instantiated on a machine with the address in source agent field 526, to monitor objects on a machine with the address in Target IP/Host Name field 528. A confirmation message may be generated as shown in the window of FIG. 5D. The administrator may then confirm the instantiation of the instance by examining the appropriate entries as shown in FIG. 5E.

Figure 5E:
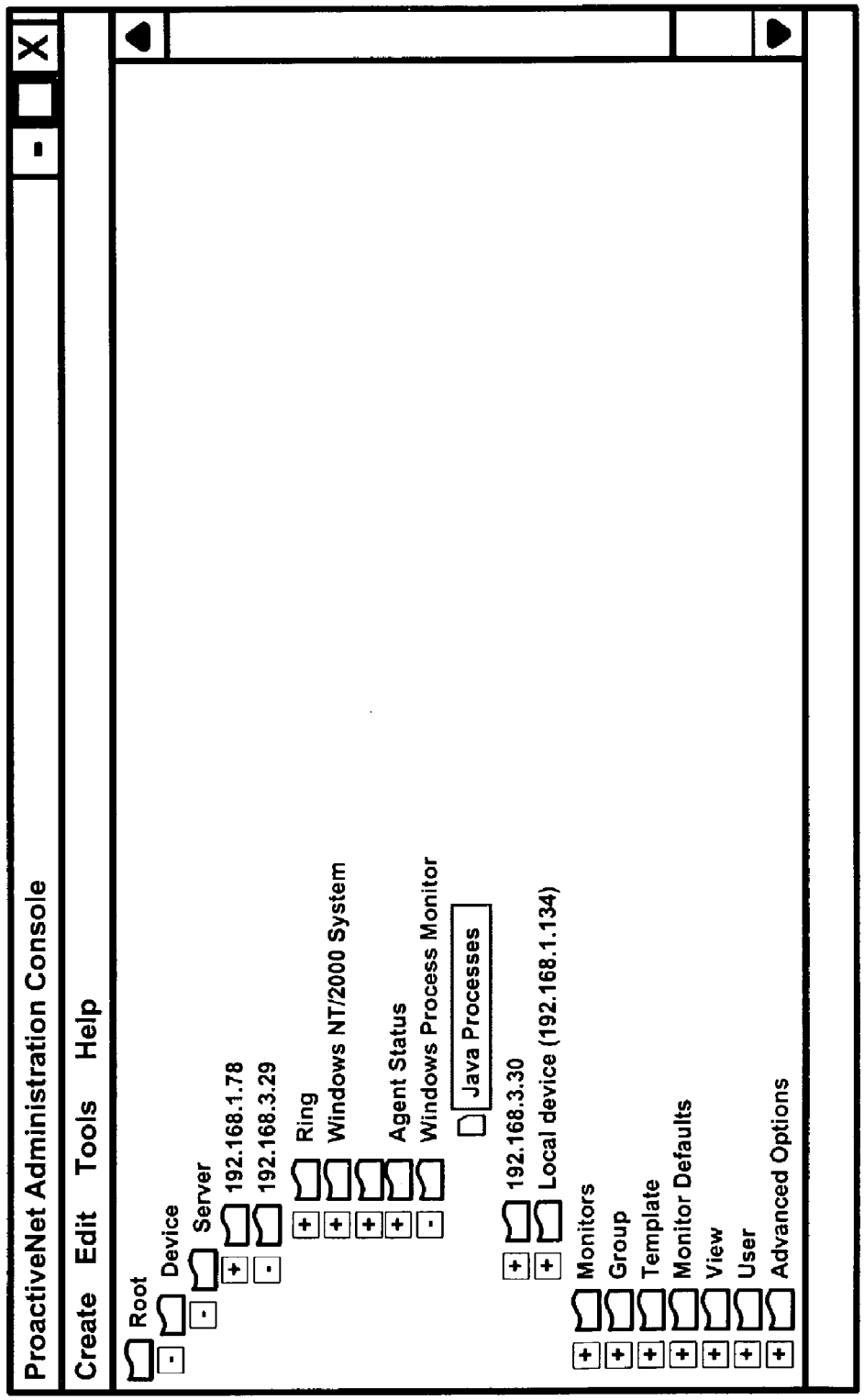
FIG. 5E contains a display screen illustrating the manner in which an administrator may confirm the successful instantiation of a monitor instance in one embodiment.

With reference to FIG. 5E, all the monitor instances instantiated are shown at the hierarchy device/server/machine address (192.168.3.29 in this case). An instance with name 'Java Processes' is shown in the monitor type of 'Windows Process Monitor'. Once instantiated, the monitor instance polls the managed entity, and the received data points are stored in database 130. The description is continued with reference to the display of such data points (and other data such as alarms which are monitored).

8. Displaying the Monitored Attributes

Figure 6A:
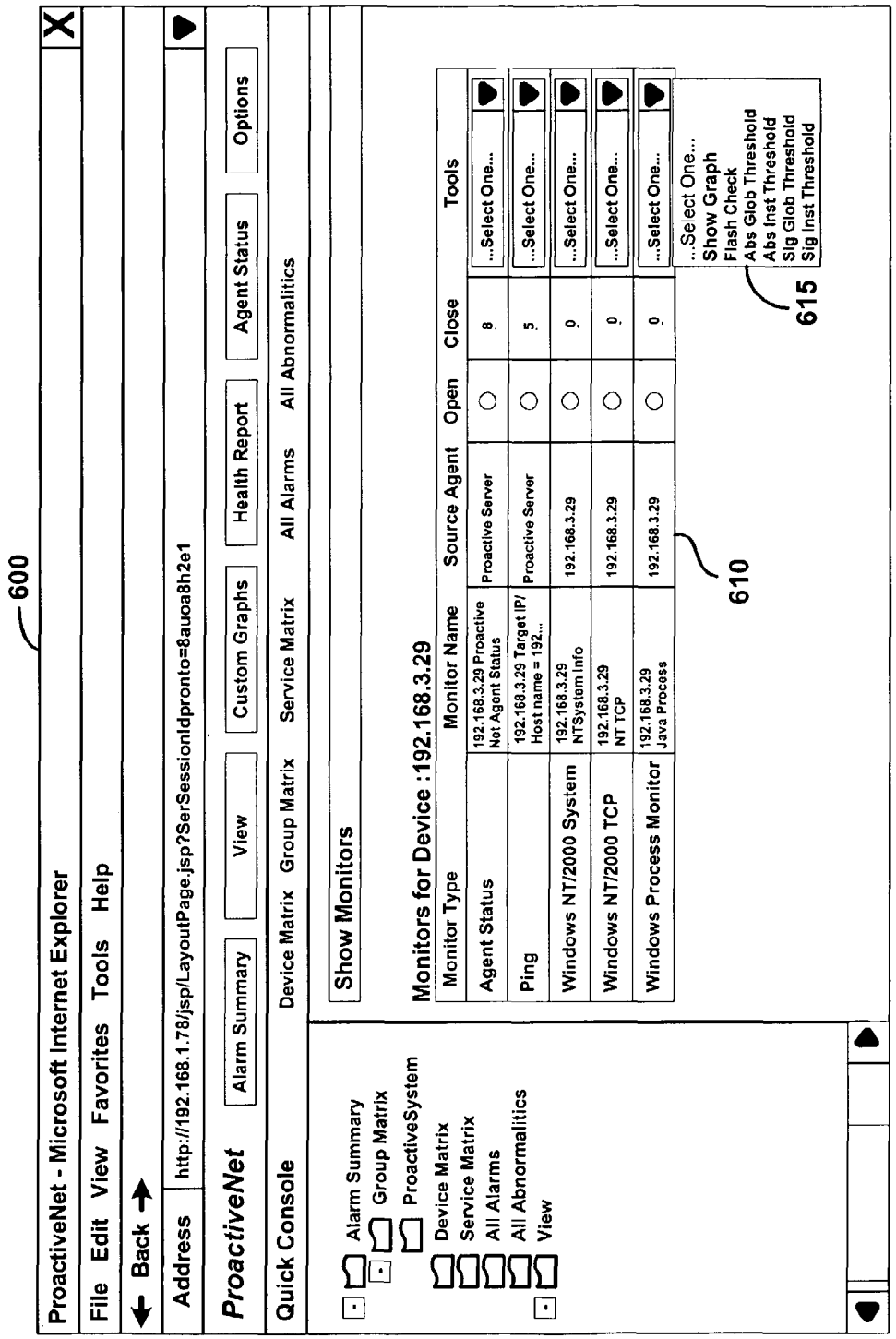
FIG. 6A contains a display screen illustrating the manner in which a user may select any of the reports/graphs generated in one embodiment.
Figure 6B:
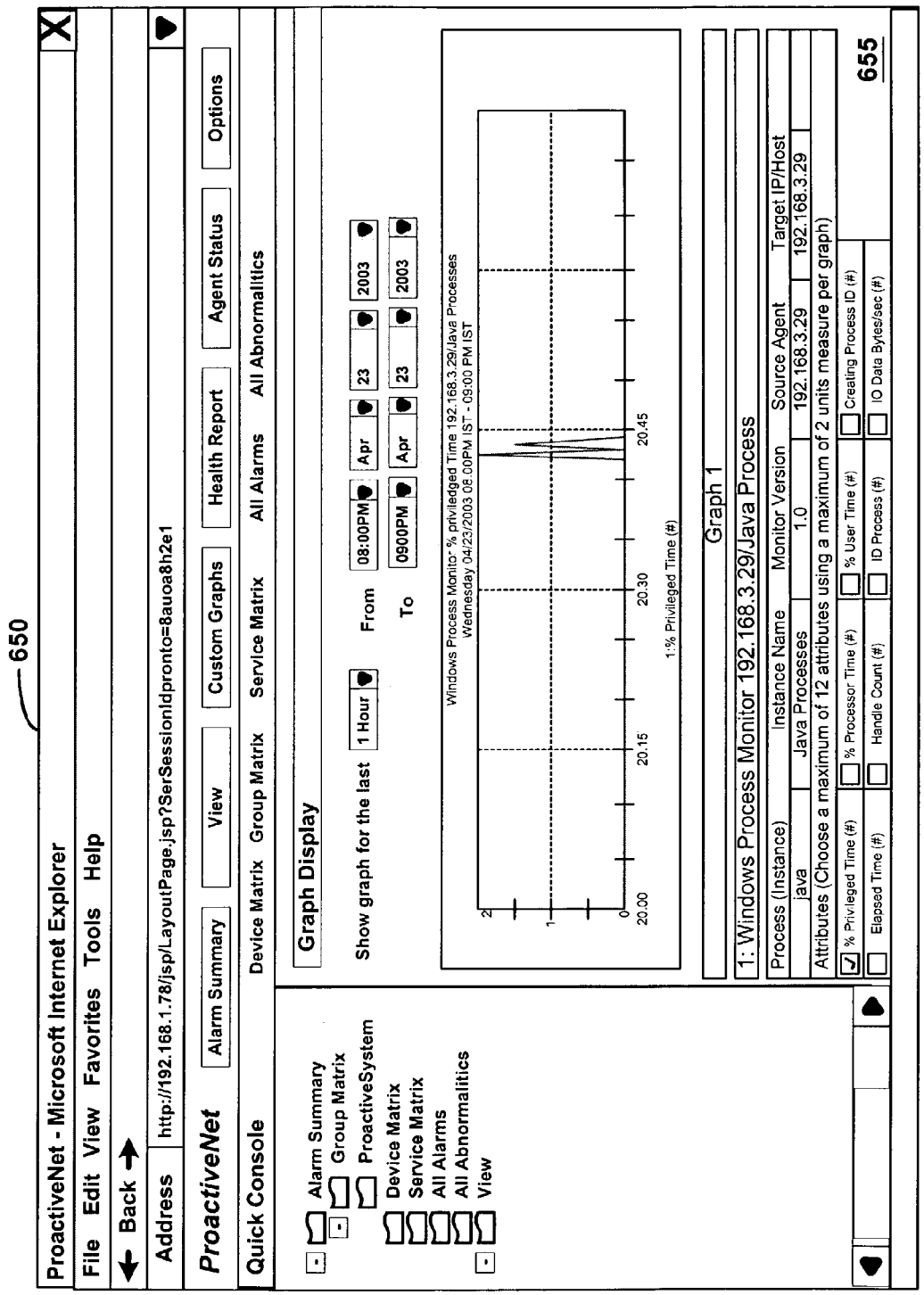
FIG. 6B contains a display screen illustrating the manner in which a user may view the reports/graphs generated in one embodiment.

FIGS. 6A and 6B contain screens together illustrating an example user interface using which the monitored attributes can be displayed in one embodiment. Screen 600 of FIG. 6A depicts the various monitor instances present on a device (supporting the execution of agent modules). As may be readily observed, the instantiated instance 'Windows Process Monitor' is shown in the last entry 610. Menu item 615 (corresponding to last entry 610) may be operated to display any of several types of information (such as graphs of data points, alarms, etc.). Assuming for illustration that a user selects 'Show Graph' option, screen 650 of FIG. 6B is displayed.

With respect to FIG. 6B, it may be observed that the one entry ("% Privileged Time") checked off in the 'Graph Default' column of FIG. 4C is displayed by default. The data points for the other attributes may also be displayed by checking off the boxes corresponding to other attributes in area 655.

Thus, it may be appreciated that the interfaces above enable selection of only attributes desired to be monitored. Such attributes include any newly available attributes as well (in addition to any already existing attributes). The description is continued with reference to some implementation considerations.

9. Implementation Considerations

It will be appreciated by one skilled in the relevant arts that the features and interfaces described above may be implemented using several approaches depending on factors such as implementation environment, design choices, etc. The description is continued with reference to some general considerations in an example implementation.

In an embodiment, the information received in the interfaces of FIGS. 4A through 4C is first stored in the form of a meta file. Portions of the meta file are depicted in FIGS. 7A-7C and 8A-8B. In general, data in the meta file may be referred to as specification data to define the monitor type/instance. The line numbers in the figures are unique and (substantially) contiguous, and the lines are described with reference to line numbers. Only the portions of the meta file as relevant to an understanding of the described embodiments are described in detail for conciseness.

With respect to FIG. 7A, lines 701 through 720 shows several variables that are associated with the monitor type. The variables in FIG. 7A may be viewed as a specification of the base instance (parent level) from which the actual instance (level 1) of this monitor type is derived. These variables generally control how each monitor type operates with respect to the agent module. The labels are intended to be self-explanatory, and all lines are not described here in the interest of conciseness.

Line 704 includes a unique identifier for each monitor type (MOTypeid), and the corresponding names are shown in lines 705 and 706. MOTypeid value is automatically assigned by NMS 110 during monitor type definition. The values may be assigned using some simple scheme (e.g., lowest unassigned value in a certain range of numbers). When several instances of the same monitor type are instantiated on the same agent, the MOTypeid may be used to identify the common information for all the instances.

As may be readily observed, line 706 corresponds to field 460 in FIG. 4C where the administrator defines a display name for the monitor type, and line 705 corresponds to field 461 in FIG. 4C where the administrator defines a unique monitor name for the monitor type. Several of the other variables are set by default. These are pre-defined depending on the monitor domain, the operation of the monitor type with respect to the agent module, the characteristics of the monitor type with respect to the data collection, etc.

Line 708 refers to the executable program for this monitor domain (Windows Performance Counter) within NMS 110. Line 709 refers to the current version of this monitor type and is used for change tracking purposes. Line 711 defines a flag which specifies that there is a single instance of this monitor type (Windows Process Monitor) per parent node (shown in FIG. 5E under the hierarchy device/server/machine address, where machine address is the IP address of the parent node, 192.169.3.29 in this case).

Line 712 defines a flag which specifies that instances of this monitor type can run remotely from an agent module that is outside the NMS 110. Line 713 defines a flag which specifies that instances of this monitor type can also run locally from an agent module that is inside the NMS 110. Line 714 defines an operating system mask which specifies that instances of this monitor type can only run from an agent module on Windows (wherein the value 6 is based on an encoding scheme to represent the Windows platform). Lines 715-720 define other variables which are generally relevant to the operation of the monitor type, but these are not significant with respect to the present invention and hence are not described in detail in the interest of conciseness.

With reference to FIG. 7B, lines 724-726 define an input attribute to represent the parent level instance of this monitor type (shown in various figures with the label 'Windows Process Monitor'). Variable entitled 'AttrID' (501046999 in this case) is assigned a unique value across all attributes of all monitor types within NMS 110, and is obtained by concatenating the value of a second variable 'UsrAttrID' (999 in this case) with the parent level MOTypeid value (501046) from line 704. The values may be assigned using some simple approach (e.g., lowest unassigned value in a certain range of numbers).

NMS 110 may use AttrID as a unique identifier to represent the parent level instance of this monitor type within the system. There is also a variable entitled 'DisplayName' which contains a pre-set value that is later mapped to the actual value entered by the administrator in field 460 (shown later in various figures as 'Windows Process Monitor').

The variables in lines 727-730 may be viewed as a specification of the actual instance (level 1) of this monitor type derived from the parent level instance (shown in FIG. 7A). As may be readily observed, the variables in lines 728-730 substantially correspond to the variables in lines 704-720 (in FIG. 7A). This includes an additional variable entitled 'StatsPollPeriod' which specifies the polling period (300 seconds in this case) for data collection upon instantiation.

Lines 732-737 represent the manner in which some of the input information for creating an actual instance (level 1) of this monitor type (shown in FIG. 5B) is stored in the meta file. In particular, lines 733-734 correspond to attribute 'Instance Name' (field 525) and lines 735-737 correspond to attribute 'Target IP/Host Name' (field 528) in FIG. 5B.

Lines 735-737 are used as an example to describe the significant variables for a typical input attribute used to create an actual instance (level 1) of this monitor type. Variable entitled 'AttrID' (501047070 in this case) has a unique value across all attributes of all monitor types within NMS 110, and is obtained by concatenating the value of a second variable 'UsrAttrID' (070 in this case) with the level 1 MOTypeid value (501047) from line 728. The values may be assigned using some simple scheme (e.g., lowest unassigned value in a certain range of numbers).

NMS 110 may use AttrID as a unique identifier for the attribute within the system. Variable entitled 'DisplayName' contains display string for the attribute (Target IP/Host Name in this case). Variable entitled 'UniqueName' contains a unique name value for the attribute (TARGETIP in this case). The display name is not necessarily unique, so either the AttrID value or the unique name value may be used to distinguish one attribute from another. Unique name value is intended to be in human readable form, whereas AttrID is not easily comprehensible since it is intended for computation purposes (e.g., as a key in database 130).

Variable entitled 'DataType' specifies data type for this attribute (integer in this case). Variable entitled 'AttrType' specifies type of this attribute (input in this case). Variable entitled 'DisplayType' specifies display type format for this attribute (IP address format in this case). Variable entitled 'DisplaySeqNo' specifies the order in which this attribute is displayed (third in this case, which is the position of field 528 in FIG. 5B). Variable entitled 'RequiredOnCreate' specifies if this is a required or optional input to create the monitor instance (yes in this case, shown with an asterisk mark and caption "*=required field" for field 528 in FIG. 5B).

With respect to FIG. 7C, lines 738-750 represent the manner in which some of the information input by the administrator when defining a monitor type in FIG. 4C may be stored in a meta file. In particular, lines 739-741 correspond to the counter "% Privileged Time" shown in the first row of table 490 of FIG. 4C, lines 742-744 correspond to the counter "% Processor Time" shown in the second row of table 490 of FIG. 4C, and so on. These counters constitute the specific attributes selected by the administrator for which performance data is collected from a managed element.

Lines 739-741 are used as an example to describe the significant variables for a typical attribute which is selected to collect performance data. Variable entitled 'AttrID' (501047020 in this case) whose value is unique across all attributes of all monitor types within NMS 110, and is obtained by concatenating the value of a second variable 'UsrAttrID' (020 in this case) with the level 1 MOTypeid value (501047) from line 728. The values may be assigned using some simple scheme (e.g., lowest unassigned value in a certain range of numbers). NMS 110 uses AttrID as a unique identifier for the attribute within the system.

Variable entitled 'DisplayName' contains display string for the attribute (% Privileged Time in this case). Variable entitled 'UniqueName' contains unique name value for the attribute (STATS_ATTRIB01 in this case). The display name is not necessarily unique, and thus either the AttrID value or the unique name value may be used to distinguish one attribute from another. Unique name value is intended to be in human readable form, whereas AttrID is not easily comprehensible since it is intended for computation purposes (e.g., as a key in database 130).

Variable entitled 'DataType' specifies data type for this attribute (character in this case). Variable entitled 'AttrType' specifies type of this attribute (hidden in this case). This is set to hidden since it is an input attribute used to only define the counter; it does not output the counter value obtained in a monitor poll—the counter value is actually output using a corresponding output attribute described later (FIG. 8A). Variable entitled 'Default' stores a composite value to indicate the properties of this attribute as selected in table 490 of FIG. 4C ("Process+java+% Privileged Time; 1.0; #; true; true; RAW" in this case).

With reference to table 490, the value indicates that the attribute is for the 'process' object (third column), 'Java' instance (second column), '% Privileged Time' counter (first column); the attribute has scale factor equal to '1' (sixth column); the attribute has unit of measure equal to '#' (seventh column); the attribute has the default graph option set to 'true' (eight column); the attribute has the normal data distribution option set to 'true' (ninth column); the attribute has the data form option set to 'RAW' (fifth column).

With respect to FIG. 8A, lines 801-821 represent the manner in which the data output by some of the counters in a monitor poll may be specified in the meta file. In particular, the variables 'TableName' and 'ColumnName' contain the table name and column name respectively in database 130 where the output values (data points) from each counter are stored. Lines 802-804 correspond to the counter "% Privileged Time" shown in the first row of table 490 of FIG. 4C, lines 805-807 correspond to the counter "% Processor Time" shown in the second row of table 490 of FIG. 4C, and so on.

Lines 802-804 are used as an example to describe the significant variables for a typical attribute to store its counter output values in the database. Variable entitled 'AttrID' (501047072 in this case) whose value is unique across all attributes of all monitor types within NMS 110, and is obtained by concatenating the value of a second variable 'UsrAttrID' (072 in this case) with the level 1 MOTypeid value (501047) from line 728. The values may be assigned using some simple scheme (e.g., lowest unassigned value in a certain range of numbers).

NMS 110 uses AttrID as a unique identifier for the attribute within the system. Variable entitled 'DisplayName' contains display string for the attribute (% Privileged Time in this case). Variable entitled 'UniqueName' contains unique name value for the attribute (STATS01 in this case). The display name is not necessarily unique, so either the AttrID value or the unique name value may be used to distinguish one attribute from another. Unique name value is intended to be in human readable form, whereas AttrID is not easily comprehensible since it is intended for computation purposes (e.g., as a key in database 130). Variable entitled 'AttrType' specifies type of this attribute (stats in this case). This is set to stats since it is an output attribute used to record the counter value obtained in a monitor poll.

Variable entitled 'UOM' specifies the units of measurement for this attribute (# in this case). Variable entitled IsDefaultStats' specifies if this is a default counter for which data is collected (yes in this case). Variable entitled 'TableName' has the database table name for this attribute (WinProcess in this case). The database table name is derived from the unique name for this monitor type (see field 461 of FIG. 4C and line 705 of FIG. 7A). Variable entitled 'ColumnName' has the column name for this attribute (STATS01 in this case). The column name is derived from the unique name for this attribute (STATS01 on line 802). Variable entitled 'UseNormalDistribution' specifies if the data for this attribute follows the statistical Normal Distribution form (yes in this case).

With respect to FIG. 8B, lines 852-865 represent the manner in which some of the information to control the data collection behavior of a monitor instance may be specified in the meta file. In particular, lines 852-854 correspond to drop-down box 556 in FIG. 5C and relates to the poll interval (frequency with which the monitor instance will poll to obtain counter values for attributes defined in the monitor type), and lines 863-865 correspond to drop-down box 557 in FIG. 5C and relates to the poll timeout (duration of time after which a poll will timeout in case the monitor instance is not able to complete the poll and obtain counter values for attributes defined in the monitor type). The values of the control attributes may be specified during monitor instance creation and determine the poll behavior for that monitor instance.

Lines 852-854 are used as an example to describe the significant variables for a typical control attribute. Variable entitled 'AttrID' (501047998 in this case) whose value is unique across all attributes of all monitor types within NMS 110, and is obtained by concatenating the value of a second variable 'UsrAttrID' (998 in this case) with the level 1 MOTypeid value (501047) from line 728. The values may be assigned using some simple scheme (e.g., lowest unassigned value in a certain range of numbers). NMS 110 uses AttrID as a unique identifier for the attribute within the system.

Variable entitled 'DisplayName' contains display string for the attribute (Statistics Poll Interval in this case). Variable entitled 'UniqueName' contains unique name value for the attribute (STSPOLLPERIOD in this case). The display name is not necessarily unique, so either the AttrID value or the unique name value may be used to distinguish one attribute from another. Unique name value is intended to be in human readable form, whereas AttrID is not easily comprehensible since it is intended for computation purposes (e.g., as a key in database 130). Variable entitled 'DisplayType' specifies how the values for this attribute will be displayed (integer in this case).

Variable entitled 'AttrMetaType' specifies the type of this attribute (control in this case). Variable entitled 'InputOnCreate' specifies if an input value must be provided at the time of monitor instance creation (yes in this case). Variable entitled 'Editable' specifies if the value input for this attribute may be edited and set to another value. Variable entitled 'RequiredOnCreate' specifies if this is a required or optional input to create the monitor instance (yes in this case, shown with an asterisk mark and caption "*=required field" for drop-down box 556 in FIG. 5C). Variable entitled 'Default' specifies the default value set for this attribute in case the administrator does not specify another value during monitor instance creation (900 seconds in this case, which equals the value 15 minutes shown in drop-down box 556 in FIG. 5C).

It should be understood that using the information such as described above in the meta file, monitor instances can be created on agent modules using several approaches.

In one approach, a database schema is generated by the administrator module 230 for the monitor type after definition according to FIG. 4C. A unique identifier (MOTypeid from line 728 in FIG. 7B) identifies the monitor type within the network management system. The database schema is then associated with each instantiation of the monitor according to FIGS. 5A-5E.

When a monitor instance is created; NMS 110 creates a unique instance identifier (InstanceID) value for each instance. The InstanceID value may be assigned using some simple scheme (e.g., lowest unassigned value in a certain range of numbers) and is then stored in database 130 along with the associated data (from FIGS. 7B-7C and 8A-8B) for each monitor instance. When used together, MOTypeid uniquely identifies the monitor type and InstanceID uniquely identifies an instance of this monitor type within the network management system. The database schema associated with the monitor type is used to create the necessary tables in database 130 to store the data points received during a monitor poll.

In addition, program logic specifying the manner in which each of the attributes can be retrieved may also be sent to agent module 140-X. In an embodiment, the program logic is sent in the form of a JAR (Java Archive) file, and a JVM (Java Virtual Machine) executes the JAR file. The resulting program is provided the ability to poll the corresponding device (with the corresponding control parameters), and send the data points (along the identifiers of the table/column where the data points are to be stored). The JAR file generally contains various objects which provide the feature(s) described above.

The implementation of such a JAR file will be apparent to one skilled in the relevant arts. In general, the implementation of the program logic to poll a device depends on the specific machine (vendor, operating system, connectivity environment, support of application programming interfaces, etc.) on which the monitor instance is implemented, and such implementation will be apparent to one skilled in the relevant arts.

In addition, the specific manner in which the attributes to be monitored, the manner in which a monitor instance sends back (or stores) the data points in database 130, etc., are merely exemplary. The implementation of such an approach based on the above disclosure will also be apparent to one skilled in the relevant arts. Various modifications may be made to the above described approaches, without departing from the scope and spirit of various aspects of the present invention, as will also be apparent to one skilled in the relevant arts. Such modifications will also be apparent to one skilled in the relevant arts.

It should be understood that the different components of the network management system can be implemented in a combination of one or more of hardware, software and firmware. In general, when throughput performance is of primary consideration, the implementation is performed more in hardware (e.g., in the form of an application specific integrated circuit). When flexibility and/or cost are of primary consideration, the implementation is performed more in software (e.g., using a processor executing instructions provided in software/firmware). Cost and performance can be balanced by implementing with a desired mix of hardware, software and/or firmware. An embodiment implemented substantially in software is described below.

10. Software Implementation

Figure 9:
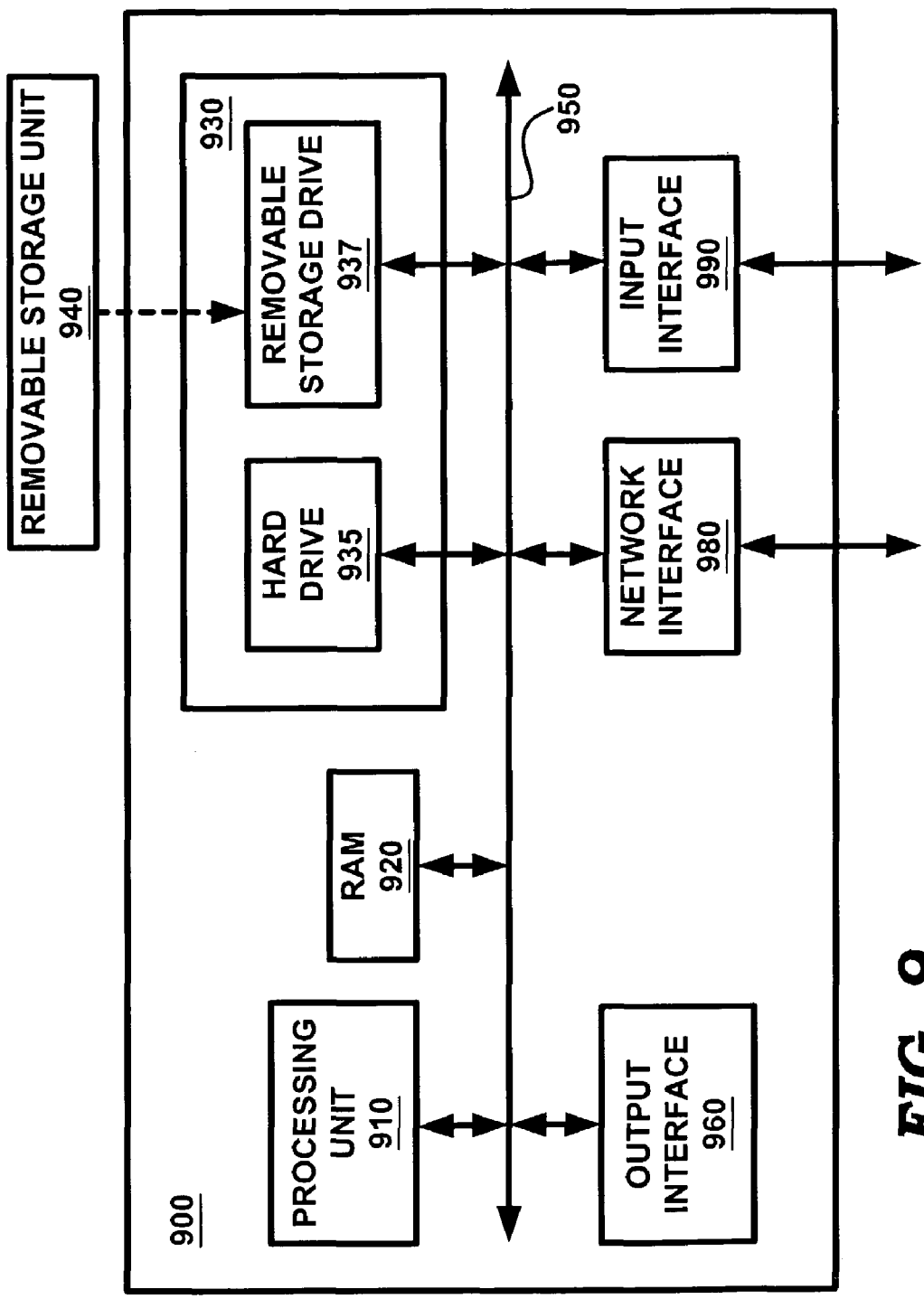
FIG. 9 is a block diagram of a computer system illustrating an example system in which various aspects of the present invention can be implemented.

FIG. 9 is a block diagram illustrating the details of system 900 in one embodiment. System 900 may correspond to NMS 110, administrator tool 160, and/or client 120. System 900 is shown containing processing unit 910, random access memory (RAM) 920, secondary memory 930, output interface 960, network interface 980 and input interface 990. Each component is described in further detail below.

Input interface 990 (e.g., interface with a key-board and/or mouse, not shown) enables a user/administrator to provide any necessary inputs to System 900. Output interface 960 provides output signals (e.g., display signals to a display unit, not shown), and the two interfaces together can form the basis for a suitable user interface for an administrator to interact with system 900. For example, assuming an administrator (or user) interacts with NMS 110 using command line interface, the corresponding interface may be provided using input interface 990 and output interface 960.

Network interface 980 may enable system 900 to send/receive data packets to/from other systems on corresponding paths using protocols such as internet protocol (IP). The packets may form the basis for instantiating a monitor instance, to receive data points corresponding to various attributes, interface with client 120, etc. Network interface 980, output interface 960 and input interface 990 can be implemented in a known way.

RAM 920 receives instructions and data on path 950 (which may represent several buses) from secondary memory 930, and provides the instructions to processing unit 910 for execution.

Secondary memory 930 may contain units such as hard drive 935 and removable storage drive 937. Secondary memory 930 may store the software instructions and data, which enable System 900 to provide several features in accordance with the present invention.

Some or all of the data and instructions may be provided on removable storage unit 940 (or from a network using protocols such as Internet Protocol), and the data and instructions may be read and provided by removable storage drive 937 to processing unit 910. Floppy drive, magnetic tape drive, CD-ROM drive, DVD Drive, Flash memory, removable memory chip (PCMCIA Card, EPROM) are examples of such removable storage drive 937.

Processing unit 910 may contain one or more processors. Some of the processors can be general purpose processors which execute instructions provided from RAM 920. Some can be special purpose processors adapted for specific tasks (e.g., for memory/queue management). The special purpose processors may also be provided instructions from RAM 920.

In general, processing unit 910 reads sequences of instructions from various types of memory medium (including RAM 920, secondary memory 930 and removable storage unit 940), and executes the instructions to provide various features of the present invention described above. Thus, a medium providing such instructions/data may be referred to as a computer readable medium.

11. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of monitoring a managed element, said method being performed in a network management system, said method comprising:
   storing data representing a monitor type;
   receiving from a first user an address of a device at which said managed element is to be monitored;
   instantiating a monitor instance of a plurality of monitor instances according to said monitor type, wherein said monitor instance is associated with said address of said device;
   discovering, by said instantiated monitor instance, a first plurality of attributes available on said managed element by retrieving said first plurality of attributes from said managed element using said address based on receiving said address of said device;
   displaying said first plurality of attributes;
   enabling said first user to select a second plurality of attributes from said first plurality of attributes;
   polling, by said monitor instance, said managed element to retrieve a plurality of data points related to each of said second plurality of attributes in response to said first user selecting said second plurality of attributes, wherein said monitor instance performs polling of said device based on said first user having specified said address;
   storing said plurality of data points in a memory; and
   enabling a second user to view said plurality of data points stored in said memory.

2. The method of claim 1, wherein said managed element comprises an instance of an object dynamically created on said device/network element, and wherein said first plurality of attributes comprise said second plurality of attributes.

3. The method of claim 2, wherein said object comprises a process object.

4. The method of claim 3, wherein said process object is implemented in Windows NT environment.

5. The method of claim 1, further comprising enabling said first user to specify a polling frequency to be specified associated with each of said second plurality of attributes, wherein said polling is performed at said polling frequency.

6. The method of claim 1, further comprising enabling said first user to specify a display property associated with each of said second plurality of attributes, wherein said plurality of data points are displayed according to said display property.

7. The method of claim 1, further comprising:
   installing an agent module on a monitor server;
   sending a program logic and a specification data to said monitor server, wherein said program logic indicates the manner in which said plurality of data points can be retrieved from said device/network element, and said specification data indicates that said second plurality of attributes are to be monitored.

8. The method of claim 7, further comprising:
   defining a table in a database to store said plurality of data points, wherein said specification data further comprises indicating said table and a column in said table where each of said plurality of data points are to be stored; and
   sending from said monitor instance said data indicating said table and said column associated with each of said plurality of data points such that said plurality of data points are stored in said column of said table.

9. The method of claim 1, wherein said memory is a non-volatile memory.

10. A non-transitory computer readable storage medium storing one or more sequences of instructions for causing a network management system to monitor a managed element, wherein execution of said one or more sequences of instructions by one or more processors contained in said network management system causes said network management system to perform the actions of:
    storing data representing a monitor type;
    receiving from a first user an address of a device at which said managed element is to be monitored;
    instantiating a monitor instance of a plurality of monitor instances according to said monitor type, wherein said monitor instance is associated with said address of said device;
    discovering, by said instantiated monitor instance, a set of instances of an object available on said device by retrieving the corresponding information using said address based on receiving said address of said device, such that the set of instances comprises at least one instance that is dynamically created;
    displaying a first plurality of attributes associated with a type of an instance of said set of instances that is dynamically created;
    enabling a first user to select a second plurality of attributes from said first plurality of attributes;
    polling, by said monitor instance, said managed element to retrieve a plurality of data points related to each of said second plurality of attributes in response to said first user selecting said second plurality of attributes, wherein said monitor instance performs polling of said device based on said first user having specified said address;
    storing said plurality of data points in a memory; and
    enabling a second user to view said plurality of data points stored in said memory.

11. The non-transitory computer readable storage medium of claim 10, wherein said object comprises a process object.

12. The non-transitory computer readable storage medium of claim 11, wherein said process object is implemented in Windows NT environment.

13. The non-transitory computer readable storage medium of claim 10, further comprising enabling said first user to specify a polling frequency to be specified associated with each of said second plurality of attributes, wherein said polling is performed at said polling frequency.

14. The non-transitory computer readable storage medium of claim 10, further comprising enabling said first user to specify a display property associated with each of said second plurality of attributes, wherein said plurality of data points are displayed according to said display property.

15. The non-transitory computer readable storage medium of claim 10, further comprising:
    installing an agent module on a monitor server;
    sending a program logic and a specification data to said monitor server, wherein said program logic indicates the manner in which said plurality of data points can be retrieved from said device/network element, and said specification data indicates that said second plurality of attributes are to be monitored.

16. The non-transitory computer readable storage medium of claim 15, further comprising:
defining a table in a database to store said plurality of data points, wherein said specification data further comprises indicating said table and a column in said table where each of said plurality of data points are to be stored; and
sending from said monitor instance said data indicating said table and said column associated with each of said plurality of data points such that said plurality of data points are stored in said column of said table.

17. A network management system comprising:
means for storing data representing a monitor type;
means for receiving from a first user an address of a device at which said managed element is to be monitored;
means for instantiating a monitor instance of a plurality of monitor instances according to said monitor type, wherein said monitor instance is associated with said address of said device;
means for discovering, by said instantiated monitor instance, a first plurality of attributes available on a managed element by retrieving said first plurality of attributes from said managed element using said address based on receiving said address of said device, wherein said first plurality of attributes are created dynamically on said managed element;
means for displaying said first plurality of attributes;
means for enabling said first user to select a second plurality of attributes from said first plurality of attributes;
means for polling, by said monitor instance, said managed element to retrieve a plurality of data points related to each of said second plurality of attributes in response to said first user selecting said second plurality of attributes, wherein said monitor instance performs polling of said device based on said first user having specified said address;
means for storing said plurality of data points in a memory; and
means for enabling a second user to view said plurality of data points stored in said memory.

18. The network management system of claim 17, wherein said managed element comprises an instance of an object dynamically created on said device/network element, and wherein said first plurality of attributes comprise said second plurality of attributes.

19. The network management system of claim 18, wherein said object comprises a process object.

20. The network management system of claim 19, wherein said process object is implemented in Windows NT environment.

21. A network management system for monitoring a managed element, said network management system comprising:
an administrator tool module operable to:
store data representing a monitor type;
receive from a first user an address of a device at which said managed element is to be monitored;
instantiate a monitor instance of a plurality of monitor instances according to said monitor type, wherein said monitor instance is associated with said address of said device;
discover, by said instantiated monitor instance, a first plurality of attributes available on said managed element by retrieving said first plurality of attributes from said managed element using said address based on receiving said address of said device, wherein said first plurality of attributes are created dynamically on said managed element;
display said first plurality of attributes; and
enable said first user to select a second plurality of attributes from said first plurality of attributes;
said instantiated monitor instance polling said managed element to retrieve a plurality of data points related to each of said second plurality of attributes in response to said first user selecting said second plurality of attributes, wherein said monitor instance performs polling of said device based on said first user having specified said address;
a database storing said plurality of data points retrieved by said monitor instance; and
a network management station enabling a second user to view said plurality of data points stored in said database.

22. The network management system of claim 21, wherein said managed element comprises an instance of an object dynamically created on said device/network element, and wherein said first plurality of attributes comprise said second plurality of attributes.

23. The network management system of claim 22, wherein said object comprises a process object.

24. The network management system of claim 23, wherein said process object is implemented in Windows NT environment.

25. The network management system of claim 21, wherein said administrator tool enables said first user to specify a polling frequency to be specified associated with each of said second plurality of attributes, wherein said polling is performed at said polling frequency.

26. The network management system of claim 21, wherein said administrator tool enables said first user to specify a display property associated with each of said second plurality of attributes, wherein said plurality of data points are displayed according to said display property.

27. The network management system of claim 21, wherein said network management station comprises an agent controller enabling instantiation of said plurality of monitor instances according to said monitor type, said plurality of monitor instances comprising said monitor instance.

28. The network management system of claim 27, wherein said agent controller installs an agent module on a monitor server, said agent controller sending a program logic and a specification data to said monitor server, wherein said program logic indicates the manner in which said plurality of data points can be retrieved from said device/network element, and said specification data indicates that said second plurality of attributes are to be monitored.

29. The network management system of claim 28, wherein said administrator tool is integrated into said network management station as one unit.

30. The network management system of claim 28, wherein said monitor server is integrated into said device/network element or said network management station.

31. A method of monitoring a managed element, said method being performed in a network management system, said method comprising:
storing data representing a monitor type;
receiving from a user an address of a device at which said managed element is to be monitored;
instantiating a monitor instance of a plurality of monitor instances according to said monitor type, wherein said monitor instance is associated with said address of said device;

discovering, by said instantiated monitor instance, a plurality of attributes available on said managed element by retrieving said plurality of attributes from said managed element using said address based on receiving said address of said device, wherein said plurality of attributes are created dynamically in said managed element;

displaying said first plurality of attributes;

enabling said user to select a set of attributes contained in said plurality of attributes;

polling, by said monitor instance, said managed element to retrieve a plurality of data points related to each of said set of attributes in response to said user selecting said set of attributes, wherein said monitor instance performs polling of said device based on said user having specified said address;

storing said plurality of data points in a memory; and enabling users to view said plurality of data points stored in said memory.

32. The method of claim 31, wherein said memory is a non-volatile memory.

* * * * *